US010257853B2

(12) United States Patent
Yerramalli et al.

(10) Patent No.: US 10,257,853 B2
(45) Date of Patent: Apr. 9, 2019

(54) TECHNIQUES FOR IDENTIFYING RESOURCES TO TRANSMIT A CHANNEL RESERVATION SIGNAL

(71) Applicant: QUALCOMM Incorporated, San Diego, CA (US)

(72) Inventors: Srinivas Yerramalli, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 14/964,136

(22) Filed: Dec. 9, 2015

(65) Prior Publication Data

US 2016/0183296 A1    Jun. 23, 2016

Related U.S. Application Data

(60) Provisional application No. 62/093,983, filed on Dec. 18, 2014.

(51) Int. Cl.
*H04W 74/00*  (2009.01)
*H04W 16/14*  (2009.01)
(Continued)

(52) U.S. Cl.
CPC ......... *H04W 74/004* (2013.01); *H04W 16/14* (2013.01); *H04W 72/0413* (2013.01);
(Continued)

(58) Field of Classification Search
CPC ............... H04W 74/004; H04W 16/14; H04W 72/0413; H04W 72/0453; H04W 74/08;
(Continued)

(56) References Cited

U.S. PATENT DOCUMENTS

2009/0109908 A1\* 4/2009 Bertrand ............... H04L 5/0051
370/329
2011/0211538 A1\* 9/2011 Kakura ............... H04W 72/042
370/329
(Continued)

OTHER PUBLICATIONS

Ericsson et al., "Contention Based Uplink Transmissions," 3GPP TSG-RAN WG2 #66bis, R2-093812, Los Angeles, USA, Jun. 29-Jul. 3, 2009, 4 pgs., XP_50352029A, 3rd Generation Partnership Project.
(Continued)

*Primary Examiner* — Ian N Moore
*Assistant Examiner* — Latresa A McCallum
(74) *Attorney, Agent, or Firm* — Dalei Dong; Holland & Hart

(57) ABSTRACT

Techniques are described for wireless communication. A first method includes winning, at a UE, contention for access to a channel of a shared radio frequency spectrum band; identifying a number of frequency resources of the band that are allocated to the UE for at least one uplink transmission following the winning contention for access; and transmitting a channel reservation signal using a set of frequency resources associated with the identified number of frequency resources. A second method includes winning, at a UE, contention for access to a channel of a shared radio frequency spectrum band; identifying a number of frequency resources of the band that are pre-designated by a base station for transmission of a channel reservation signal; and transmitting the channel reservation signal, after the winning contention for access, using a set of frequency resources associated with the identified number of pre-designated frequency resources.

26 Claims, 16 Drawing Sheets

(51) Int. Cl.
H04W 72/04 (2009.01)
H04W 74/08 (2009.01)
H04W 72/12 (2009.01)

(52) U.S. Cl.
CPC ....... H04W 72/0453 (2013.01); H04W 74/08 (2013.01); H04W 74/0816 (2013.01); *H04W 72/1289* (2013.01); *H04W 74/002* (2013.01)

(58) Field of Classification Search
CPC ......... H04W 74/0816; H04W 72/1289; H04W 74/002
See application file for complete search history.

(56) References Cited

U.S. PATENT DOCUMENTS

| | | | |
|---|---|---|---|
| 2012/0008589 A1* | 1/2012 | Iwai | H04B 1/713 370/329 |
| 2012/0307870 A1* | 12/2012 | Hakola | H04B 1/713 375/135 |
| 2013/0058288 A1* | 3/2013 | Nentwig | H04J 11/0023 370/329 |
| 2013/0194944 A1* | 8/2013 | Soyak | H04W 16/14 370/252 |
| 2013/0343288 A1 | 12/2013 | Ratasuk et al. | |
| 2014/0098690 A1* | 4/2014 | Siomina | G01S 5/12 370/252 |
| 2014/0112289 A1* | 4/2014 | Kim | H04W 16/14 370/329 |
| 2014/0192729 A1* | 7/2014 | Kim | H04L 5/001 370/329 |
| 2015/0341921 A1* | 11/2015 | Chen | H04W 72/0413 370/330 |
| 2016/0100407 A1* | 4/2016 | Gaal | H04W 72/0453 370/329 |

OTHER PUBLICATIONS

ISA/EPO, Partial International Search Report of the International Searching Authority, Int'l Appl. No. PCT/US2015/065328, dated Mar. 3, 2016, European Patent Office, Rijswijk, NL, 7 pgs.

ISA/EPO, International Search Report and Written Opinion of the International Searching Authority, Int'l Appl. No. PCT/US2015/065328, dated May 12, 2016, European Patent Office, Rijswijk, NL, 19 pgs.

Qualcomm Incorporated, "Solutions for Required Functionalities and Design Targets," 3GPP TSG RAN WG1 #78bis, R1-144000, Ljubljana, Slovenia, Oct. 6-10, 2014, 5 pgs., XP_50869665A, 3rd Generation Partnership Project.

Ratasuk et al., "License-Exempt LTE Deployment in Heterogeneous Network," 2012 International Symposium on Wireless Communication Systems (ISWCS), Paris, Aug. 28-31, 2012, pp. 246-250, XP_32263759A, Institute of Electrical and Electronics Engineers.

* cited by examiner

TECHNIQUES FOR IDENTIFYING RESOURCES TO TRANSMIT A CHANNEL RESERVATION SIGNAL

CROSS REFERENCES

The present application for patent claims priority to U.S. Provisional Patent Application No. 62/093,983 by Yerramalli et al., entitled "Techniques for Identifying Resources to Transmit a Channel Reservation Signal," filed Dec. 18, 2014, assigned to the assignee hereof, which is hereby incorporated by reference in its entirety.

BACKGROUND

Field of the Disclosure

The present disclosure, for example, relates to wireless communication systems, and more particularly to techniques for identifying resources to transmit a channel reservation signal.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over a shared radio frequency spectrum band, or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the shared radio frequency spectrum band is available. When it is determined that the channel of the shared radio frequency spectrum band is available, a channel reservation signal (e.g., a channel usage beacon signal (CUBS)) may be transmitted to reserve the channel.

SUMMARY

The present disclosure, for example, relates to one or more techniques for identifying resources to transmit a channel reservation signal. In some wireless communication systems, an apparatus such as a UE may transmit a channel reservation signal over a channel of a shared radio frequency spectrum band such that the channel reservation signal occupies at least a threshold percentage (e.g., 80%) of the channel's available frequency bandwidth at every moment in time that the channel reservation signal is being transmitted. However, as described in the present disclosure, a channel reservation signal may alternatively be transmitted over a channel of a shared radio frequency spectrum band such that, on average, the channel reservation signal occupies a threshold percentage of the channel's available frequency bandwidth over time. A channel reservation signal may also be transmitted over a channel of a shared radio frequency spectrum band in other manners.

In some examples, it may be useful to transmit a channel reservation signal over a set of resources (e.g., a set of frequency resources) associated with resources used by at least one uplink transmission over a shared radio frequency spectrum band. The at least one uplink transmission may follow or precede a time at which contention for access to the shared radio frequency spectrum band is won by an apparatus such as a UE. In other examples, it may be useful to transmit a channel reservation signal over a set of resources (e.g., a set of frequency resources) associated with a number of pre-designated resources (e.g., a number of frequency resources pre-designated by a base station for transmission of a channel reservation signal).

In an example, a method of wireless communication is described. In one configuration, the method may include winning, at a UE, contention for access to a channel of a shared radio frequency spectrum band; identifying a number of frequency resources of the channel of the shared radio frequency spectrum band that are allocated to the UE for at least one uplink transmission following the winning contention for access; and transmitting a channel reservation signal using a set of frequency resources associated with the identified number of frequency resources.

In some examples of the method, the channel reservation signal may include an uplink channel usage beacon signal (U-CUBS). In some examples, the U-CUBS may be transmitted between the winning contention for access to the channel of the shared radio frequency spectrum band and the at least one uplink transmission. In some examples, the U-CUBS may be transmitted during a first subframe, and the at least one uplink transmission may be transmitted during at least one subframe following the first subframe. In some examples, at least one physical uplink shared channel (PUSCH) may be scheduled for transmission following the winning contention for access, and identifying the number of frequency resources that are allocated to the UE for the at least one uplink transmission may include identifying at least one frequency resource allocated to a first PUSCH. In some examples, the first PUSCH may be scheduled for transmission on a first number of frequency resources in a first slot of a subframe. In some examples, the first PUSCH may be further scheduled for transmission on a second number of frequency resources in a second slot of the subframe.

In some examples of the method, at least one PUSCH and at least one physical uplink control channel (PUCCH) may be scheduled to be transmitted following the winning contention for access, and identifying the number of frequency resources that are allocated to the UE for the at least one uplink transmission may include identifying at least one frequency resource allocated for transmission of the at least one PUSCH but not identifying a frequency resource allocated to the at least one PUCCH. In some examples, the number of frequency resources may be identified in at least one uplink grant or at least one control signal.

In some examples of the method, identifying the number of frequency resources that are allocated to the UE for the at least one uplink transmission may include identifying a number of resource blocks including the number of frequency resources, and transmitting the U-CUBS may include transmitting the U-CUBS on the identified number of resource blocks. In some examples, the number of resource blocks may be identified in at least one PUSCH. In some examples, the number of resource blocks may be identified in a subframe in which the winning contention for access occurs. In some examples, the at least one uplink transmission may include a sounding reference signal (SRS). In some examples of the method, an SRS and at least one PUSCH may be scheduled for transmission following the winning contention for access, and the SRS may be scheduled for transmission in a first symbol of a subframe.

In some examples, the method may include identifying a first number of resource blocks allocated for transmission of the SRS and a second number of resource blocks allocated for transmission of the at least one PUSCH. In these examples, identifying the number of frequency resources that are allocated to the UE for the at least one uplink transmission may include identifying at least one frequency resource allocated for transmission of the at least one PUSCH when the second number of resource blocks exceeds the first number of resource blocks, and identifying at least one frequency resource allocated for transmission of the SRS when the first number of resource blocks exceeds the second number of resource blocks. In some examples, identifying the number of frequency resources that are allocated to the UE for the at least one uplink transmission may include identifying at least one frequency resource allocated for transmission of the at least one PUSCH, and identifying at least one frequency resource allocated for transmission of the SRS. In some examples of the method, the U-CUBS may include a copy of a demodulation reference signal (DM-RS) scheduled to be transmitted in at least one of: a first subframe in which the winning contention for access occurs, a second subframe following the first subframe, or a combination thereof.

In another example, an apparatus for wireless communication is described. In one configuration, the apparatus may include a processor, memory in electronic communication with the processor, and instructions stored in the memory. The instructions may be executable by the processor to win, at a UE, contention for access to a channel of a shared radio frequency spectrum band; identify a number of frequency resources of the channel of the shared radio frequency spectrum band that are allocated to the UE for at least one uplink transmission following the winning contention for access; and transmit a channel reservation signal using a set of frequency resources associated with the identified number of frequency resources. In some examples of the apparatus, the channel reservation signal may include an uplink channel usage beacon signal (U-CUBS). In some of these examples, the U-CUBS may be transmitted between the winning contention for access to the channel of the shared radio frequency spectrum band and the at least one uplink transmission. Also in some of these example, the U-CUBS may be transmitted during a first subframe, and the at least one uplink transmission is transmitted during at least one subframe following the first subframe.

In another example, another method for wireless communication is described. In one configuration, the method may include winning, at a UE, contention for access to a channel of a shared radio frequency spectrum band; identifying a number of frequency resources of the channel of the shared radio frequency spectrum band that are pre-designated by a base station for transmission of a channel reservation signal; and transmitting the channel reservation signal, after the winning contention for access, using a set of frequency resources associated with the identified number of pre-designated frequency resources.

In some examples of the method, the number of frequency resources pre-designated by the base station may include at least one of: a cyclic shift per resource block of a PUCCH, a code per resource block of the PUCCH, or a combination thereof. In some examples of the method, the channel reservation signal may include a U-CUBS. In some examples of the method, the U-CUBS may be transmitted between the winning contention for access to the channel of the shared radio frequency spectrum band and at least one uplink transmission. In some examples of the method, the channel reservation signal may include a junk transmission. In some examples of the method, the channel reservation signal may be transmitted during a gap in at least one uplink transmission.

In another example, another apparatus for wireless communication is described. In one configuration, the apparatus may include a processor, memory in electronic communication with the processor, and instructions stored in the memory. The instructions may be executable by the processor to win, at a UE, contention for access to a channel of a shared radio frequency spectrum band; identify a number of frequency resources of the channel of the shared radio frequency spectrum band that are pre-designated by a base station for transmission of a channel reservation signal; and transmit the channel reservation signal, after the winning contention for access, using a set of frequency resources associated with the identified number of pre-designated frequency resources. In some examples of the apparatus, the number of frequency resources pre-designated by the base station may include at least one of: a cyclic shift per resource block of a physical uplink control channel (PUCCH), a code per resource block of the PUCCH, or a combination thereof. Also in some examples of the apparatus, the U-CUBS may be transmitted between the winning contention for access to the channel of the shared radio frequency spectrum band and at least one uplink transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
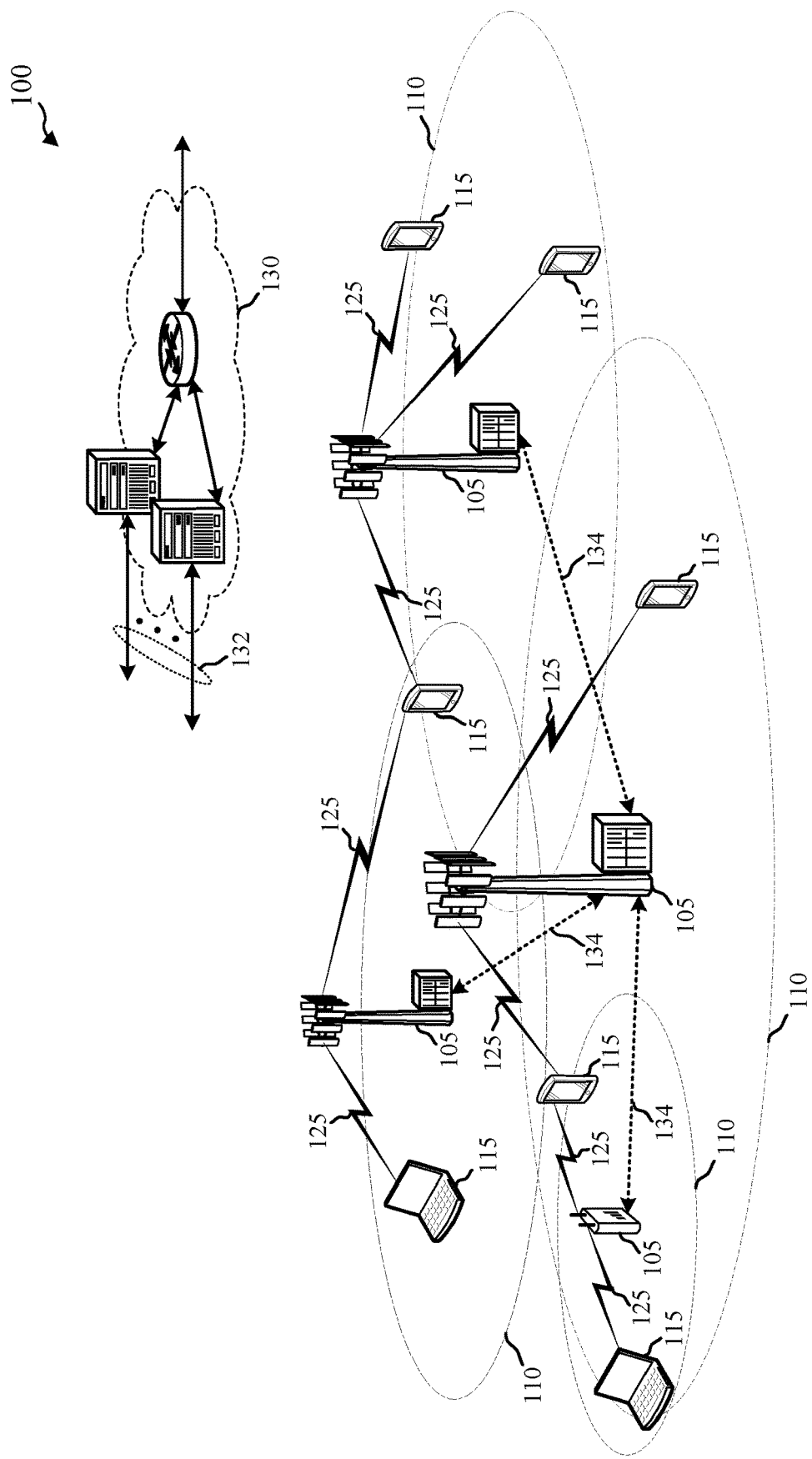
FIG. 1 illustrates an example of a wireless communication system, in accordance with various aspects of the disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to particular users, such as a licensed radio frequency spectrum band usable for LTE/LTE-A communications. The shared radio frequency spectrum band, however, may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. As noted above, before communicating over a shared radio frequency spectrum band, transmitting apparatuses may perform an LBT procedure to gain access to the medium. Such an LBT procedure may include performing a CCA procedure (or extended CCA procedure) to determine whether a channel of the shared radio frequency spectrum band is available. When it is determined that the channel of the shared radio frequency spectrum band is available, a channel reservation signal (e.g., a CUBS) may be transmitted to reserve the channel. When it is determined that a channel is not available, a CCA procedure (or extended CCA procedure) may be performed for the channel again at a later time.

The present disclosure describes techniques for identifying resources to transmit a channel reservation signal. As described in the present disclosure, a channel reservation signal may be transmitted over a channel of a shared radio frequency spectrum band such that, on average, the channel reservation signal occupies a threshold percentage of the channel's available frequency bandwidth over time. A channel reservation signal may also be transmitted over a channel of a shared radio frequency spectrum band in other manners. In some examples, it may be useful to transmit a channel reservation signal over a set of resources (e.g., a set of frequency resources) associated with resources used by at least one uplink transmission over a shared radio frequency spectrum band. The at least one uplink transmission may follow or precede a time at which contention for access to the shared radio frequency spectrum band is won by an apparatus such as a UE. In other examples, it may be useful to transmit a channel reservation signal over a set of resources (e.g., a set of frequency resources) associated with a number of pre-designated resources (e.g., a number of frequency resources pre-designated by a base station for transmission of a channel reservation signal).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or second type of operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. In some examples, UL transmissions may include transmissions of uplink control information (UCI). The UCI may be transmitted over an uplink control channel (e.g., a physical uplink control channel (PUCCH) or enhanced PUCCH (ePUCCH)). The UCI may include, for example, ACKs/NAKs of downlink transmissions, or channel state information (CSI). UL transmissions may also include transmissions of data, which data may be transmitted over a physical uplink shared channel (PUSCH) or enhanced PUSCH (ePUSCH).

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, the wireless communication system 100 may support communications over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications). Or, the wireless communication system 100 may support communications or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). Upon winning a contention for access to the shared radio frequency spectrum band, a transmitting apparatus (e.g., a base station 105 or UE 115) may transmit one or more CUBS over the shared radio frequency spectrum band. The CUBS may reserve the shared radio frequency spectrum by providing a detectable energy on the shared radio frequency spectrum band. The CUBS may also serve to identify the transmitting apparatus or serve to synchronize the transmitting apparatus and a receiving apparatus.

Figure 2:
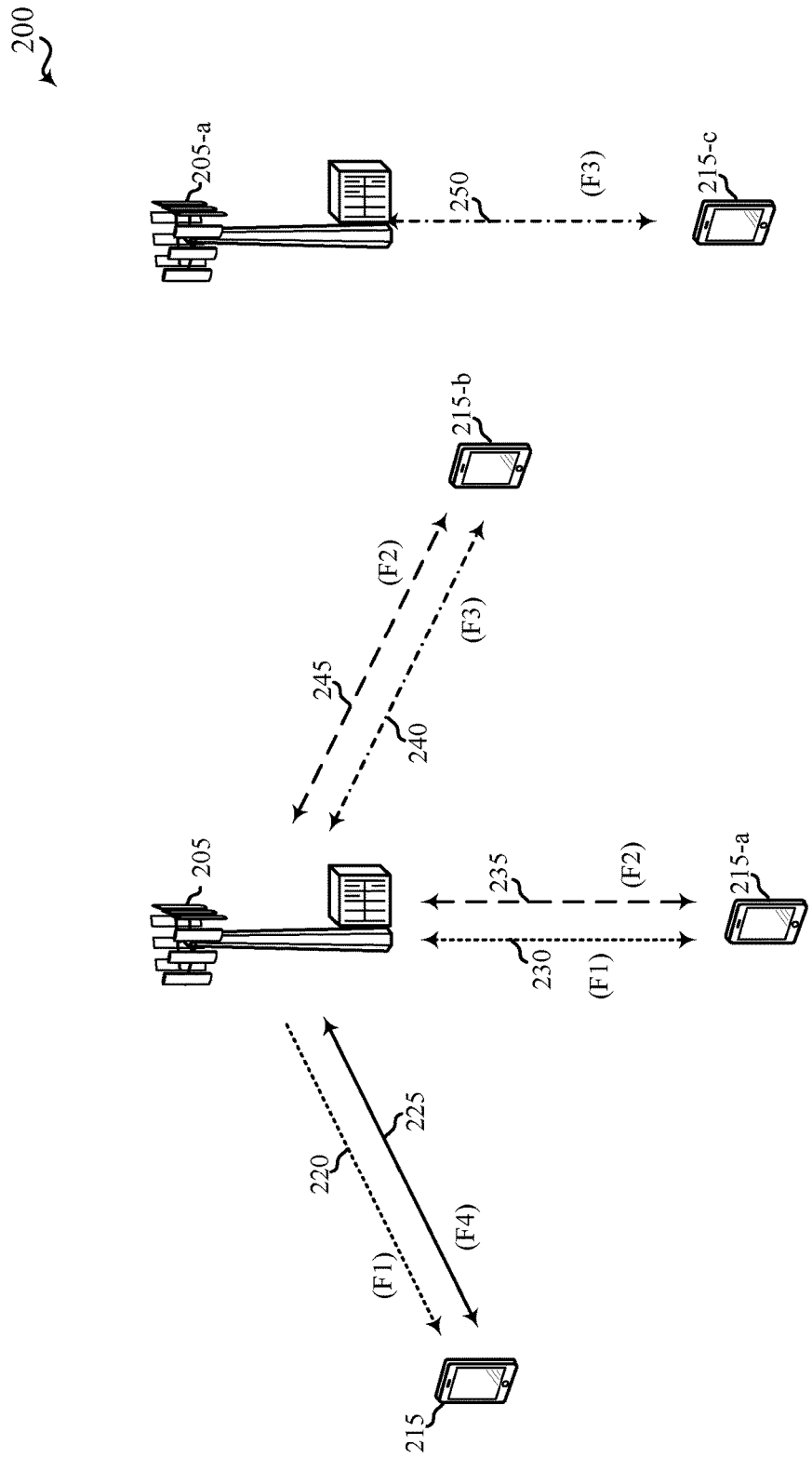
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink (e.g., the licensed assisted access mode) described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink (e.g., licensed assisted access), carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
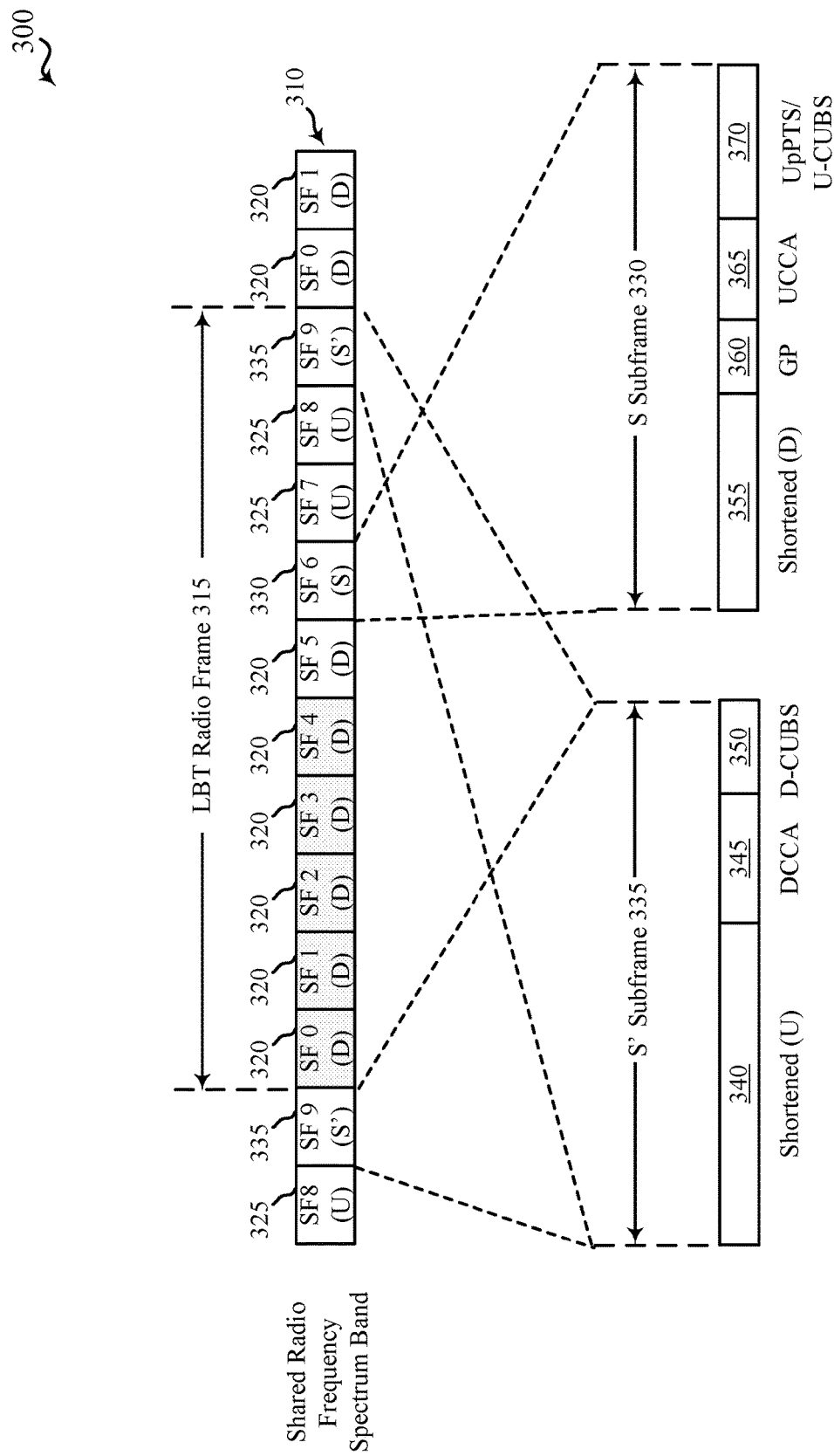
FIG. 3 shows an example of a wireless communication over a shared radio frequency spectrum band, in accordance with various aspects of the present disclosure.

FIG. 3 shows an example 300 of a wireless communication 310 over a shared radio frequency spectrum band, in accordance with various aspects of the present disclosure. In some examples, the wireless communication 310 may include a transmission of one or more uplink component carriers, which uplink component carrier(s) may be transmitted, for example, as part of a transmission made according to the supplemental downlink mode (e.g., the licensed assisted access mode), the carrier aggregation mode, or the standalone mode described with reference to FIG. 2.

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-a described with reference to FIG. 1 or 2, to reserve, for a period of time, a channel of the shared radio frequency spectrum band over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least some percentage of the available frequency bandwidth of the channel of the shared radio frequency spectrum band and satisfy one or more regulatory requirements (e.g., a requirement that transmissions over the shared radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the shared radio frequency spectrum band to transmit the D-CUBS 350.

During the S subframe 330, an uplink CCA (UCCA) procedure 365 may be performed by one or more UEs, such as one or more of the UEs 115, 215, 215-a, 215-b, or 215-c described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least some percentage of the available frequency bandwidth of the channel of the shared radio frequency spectrum band and satisfy one or more regulatory requirements (e.g., the requirement that transmissions over the shared radio frequency spectrum band occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the shared radio frequency spectrum band as an uplink pilot time slot (UpPTS) or to transmit the U-CUBS 370.

In some examples, the DCCA procedure 345 or the UCCA procedure 365 may include the performance of a single CCA procedure. In other examples, the DCCA procedure 345 or the UCCA procedure 365 may include the performance of an extended CCA procedure. The extended CCA procedure may include a random number of CCA procedures, and in some examples may include a plurality of CCA procedures. The terms DCCA procedure and UCCA procedure are therefore intended to be broad enough to cover the performance of either a single CCA procedure or an extended CCA procedure. The selection of a single CCA procedure or an extended CCA procedure, for performance by a base station or a UE during an LBT radio frame, may be based on LBT rules. In some cases, the term CCA procedure may be used in this disclosure, in a general sense, to refer to either a single CCA procedure or an extended CCA procedure.

By way of example, the LBT radio frame 315 has a DDDDDDSUUS' TDD frame structure. In other examples, an LBT radio frame may have a different TDD frame structure. For example, an LBT frame may have one of the TDD frame structures used in enhanced interference mitigation and traffic adaptation (eIMTA).

Figure 4:
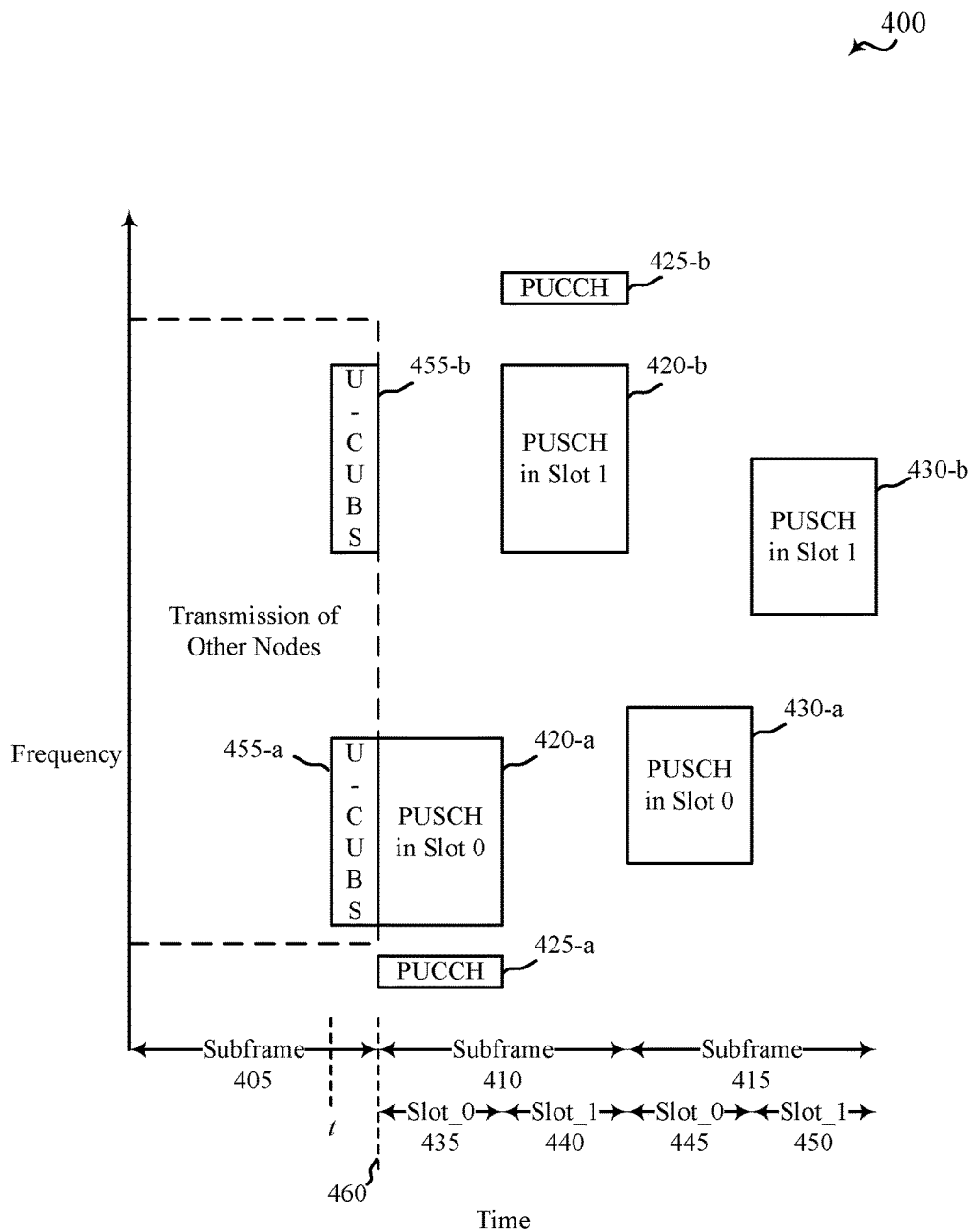
FIG. 4 shows a timing diagram for contending for access to a channel of a shared radio frequency spectrum band, and for reserving the channel, in accordance with various aspects of the present disclosure.

FIG. 4 shows a timing diagram 400 for contending for access to a channel of a shared radio frequency spectrum band, and for reserving the channel, in accordance with various aspects of the present disclosure. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). By way of example, the timing diagram 400 shows examples of transmissions made over three one millisecond (1 ms) subframes (e.g., a first subframe 405, a second subframe 410 following the first subframe 405, and a third subframe 415 following the second subframe 410). Each of the first subframe 405, the second subframe 410, and the third subframe 415 may include a respective first slot and a second slot.

A first PUSCH having a first PUSCH portion 420-a and a second PUSCH portion 420-b, and a PUCCH having a first PUCCH portion 425-a and a second PUCCH portion 425-b may be scheduled for transmission by a UE in the second subframe 410. A second PUSCH having a first PUSCH portion 430-a and a second PUSCH portion 430-b may be scheduled for transmission by the UE in the third subframe 415. By way of example, the first PUSCH portion 420-a of the first PUSCH may be scheduled for transmission in a first slot 435 of the second subframe 410, and the second PUSCH portion 420-b of the first PUSCH may be scheduled for transmission in a second slot 440 of the second subframe 410.

Similarly, the first PUCCH portion 425-a may be scheduled for transmission in the first slot 435 of the second subframe 410, and the second PUCCH portion 425-b may be scheduled for transmission in the second slot 440 of the second subframe 410. Also by way of example, the first PUSCH portion 430-a of the second PUSCH may be scheduled for transmission in a first slot 445 of the third subframe 415, and the second PUSCH portion 430-b of the second PUSCH may be scheduled for transmission in a second slot 450 of the third subframe 415.

The various uplink transmissions may be transmitted on overlapping or non-overlapping frequency resources, as well as overlapping or non-overlapping time resources. The resources on which the portions of the first PUSCH, the portions of the PUCCH, and the portions of the second PUSCH scheduled for transmission may be allocated, for example, in one or more uplink grants or control signaling (e.g., RRC signaling) received by the UE prior to or during the first subframe 405. The resources may be allocated as frequency resources (e.g., one or more frequency carriers or frequency sub-carriers), time resources (e.g., one or more subframes, slots, or symbol periods), resource blocks (i.e., a block of resources defined by an intersection of frequency resources and time resources), etc.

During the first subframe 405, the UE may contend for access to a channel of the shared radio frequency spectrum band. In some examples, contending for access may include the performance of a CCA procedure or an extended CCA (ECCA) procedure. If the UE does not win contention for access to the channel of the shared radio frequency spectrum band, the portions of the first PUSCH, the PUCCH, and the portions of the second PUSCH may not be transmitted. However, by way of example, FIG. 4 shows the UE winning contention for access to the channel of the shared radio frequency spectrum band at a time t during the first subframe 405. Upon winning contention for access to the channel of the shared radio frequency spectrum band, the UE may transmit a channel reservation signal that includes a first channel reservation signal portion 455-a and a second channel reservation signal portion 455-b to reserve the channel for transmission of at least one uplink transmission (e.g., the first PUSCH, the PUCCH, and the second PUSCH). In some examples, the portions of the channel reservation signal may be transmitted between the time t and a next subframe boundary 460.

In some examples, there may be no resources (or no PUSCH resources) allocated to the UE for uplink transmissions during the first subframe 405. Transmission of the channel reservation signal during the first subframe 405 may therefore overlap one or more transmissions of other nodes (e.g., uplink transmissions of other UEs).

In some examples, a number of frequency resources of the channel of the shared radio frequency spectrum band, which frequency resources are allocated to the UE for at least one uplink transmission following time t, may be identified for transmission of the channel reservation signal. The frequency resources may be identified by resource block, frequency carrier, frequency sub-carrier, etc. In some examples, a number of frequency resources of the first PUSCH may be identified. In some examples, the identified number of frequency resources of the first PUSCH may include the frequency resources allocated for transmission of the first PUSCH portion 420-*a* in the first slot 435 of the second subframe 410. In other examples, the identified number of frequency resources of the first PUSCH may include the frequency resources allocated in the first slot 435 and the second slot 440 of the second subframe 410 (e.g., the frequency resources allocated for transmission of the first PUSCH portion 420-*a* and the second PUSCH portion 420-*b* of the first PUSCH). Transmission of the channel reservation signal on the frequency resources allocated to the first PUSCH in the first slot 435 of the second subframe 410 may limit interference with other transmissions to a smaller number of frequency resources, but create higher localized interference (e.g., due to a total transmit power being concentrated over a smaller number of frequency resources). Transmission of the channel reservation signal on both the frequency resources allocated to the first PUSCH in the first slot 435 of the second subframe 410 and the frequency resources allocated to the first PUSCH in the second slot 440 of the second subframe 410 may create a potential for interference on a greater number of frequency resources, but reduce localized interference (e.g., due to a total transmit power being spread over a greater number of frequency resources).

When resources are allocated for simultaneous transmissions of a PUSCH (e.g., the first PUSCH) and a PUCCH, identification of PUCCH resources for transmission of the channel reservation signal may be avoided, because PUCCH transmissions may be more important and it may be undesirable to risk interfering with the PUCCH transmissions of other nodes. In other examples, a base station may designate (e.g., pre-designate) PUCCH frequency resources that may be used for transmission of the channel reservation signal. For example, a base station may pre-designate at least one of: a cyclic shift per resource block of a PUCCH (e.g., when using PUCCH Format 1 or Format 2), a code per resource block of a PUCCH (e.g., when using PUCCH Format 3), or a combination thereof. The frequency resource(s) may be pre-designated in one or more uplink grants or control signaling received by the UE.

A set of frequency resources associated with the identified number of frequency resources may be used to transmit the channel reservation signal. For example, when the identified number of frequency resources include the frequency resources allocated for transmission of the first PUSCH portion 420-*a* in the first slot 435 of the second subframe 410, the first channel reservation signal portion 455-*a* may be transmitted on a first set of frequency resources (e.g., a set of frequency resources associated with the frequency resources of the first PUSCH portion 420-*a* of the first PUSCH). By way of further example, when the identified number of frequency resources include the frequency resources allocated for transmission of the first PUSCH portion 420-*a* in the first slot 435 and the second slot 440 of the second subframe 410, the first channel reservation signal portion 455-*a* may be transmitted on a first set of frequency resources associated with the first PUSCH portion 420-*a* and the second channel reservation signal portion 455-*b* may be transmitted on a second set of frequency resources (e.g., a set of frequency resources associated with the frequency resources of the second PUSCH portion 420-*b* of the first PUSCH).

In some examples, the channel reservation signal may include a U-CUBS. The U-CUBS may be transmitted between the time t and the at least one uplink transmission (e.g., the first PUSCH). In some examples, the U-CUBS may be transmitted during the first subframe 405, and the at least one uplink transmission may be transmitted during at least one subframe following the first subframe 405 (e.g., the second subframe 410).

Figure 5:
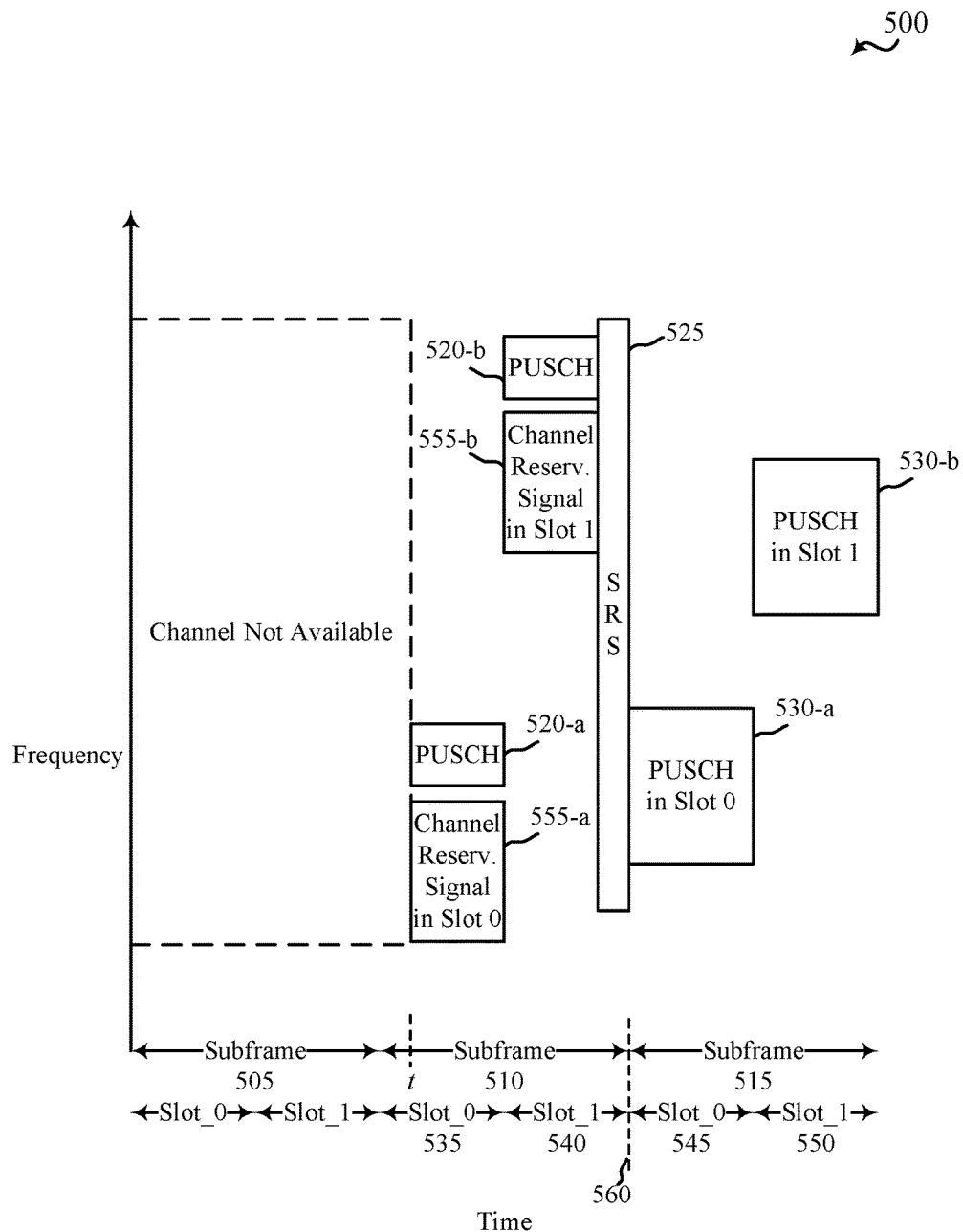
FIG. 5 shows a timing diagram for contending for access to a channel of a shared radio frequency spectrum band, and for reserving the channel, in accordance with various aspects of the present disclosure.

FIG. 5 shows a timing diagram 500 for contending for access to a channel of a shared radio frequency spectrum band, and for reserving the channel, in accordance with various aspects of the present disclosure. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). By way of example, the timing diagram 500 shows examples of transmissions made over three one millisecond (1 ms) subframes (e.g., a first subframe 505, a second subframe 510 following the first subframe 505, and a third subframe 515 following the second subframe 510). Each of the first subframe 505, the second subframe 510, and the third subframe 515 may include a respective first slot and second slot.

A first PUSCH (having a first PUSCH portion 520-*a* and a second PUSCH portion 520-*b*) and an SRS 525 may be scheduled for transmission by a UE in the second subframe 510, and a second PUSCH (having a first PUSCH portion 530-*a* and a second PUSCH portion 530-*b*) may be scheduled for transmission by the UE in the third subframe 515. By way of example, the first PUSCH portion 520-*a* of the first PUSCH may be scheduled for transmission in a first slot 535 of the second subframe 510, and the second PUSCH portion 520-*b* of the first PUSCH may be scheduled for transmission in a second slot 540 of the second subframe 510. Also by way of example, the first PUSCH portion 530-*a* of the second PUSCH may be scheduled for transmission in a first slot 545 of the third subframe 515, and the second PUSCH portion 530-*b* of the second PUSCH may be scheduled for transmission in a second slot 550 of the third subframe 515. The SRS 525 may be transmitted at an end of the second subframe 510. The various uplink transmissions may be transmitted on overlapping or non-overlapping frequency resources, as well as overlapping or non-overlapping time resources. The resources on which the first PUSCH, the SRS 525, and the second PUSCH are scheduled for transmission may be allocated, for example, in one or more uplink grants or control signaling (e.g., RRC signaling) received by the UE prior to or during the first subframe 505.

The resources may be allocated as frequency resources (e.g., one or more frequency carriers or frequency sub-carriers), time resources (e.g., one or more subframes, slots, or symbol periods), resource blocks (i.e., a block of resources defined by an intersection of frequency resources and time resources), etc.

During the first subframe 505 and part of the second subframe 510, the UE may contend for access to a channel of the shared radio frequency spectrum band. In some examples, contending for access may include the performance of an ECCA procedure. If the UE does not win contention for access to the channel of the shared radio frequency spectrum band, the portions of the first PUSCH and the portions of the second PUSCH may not be transmitted. However, by way of example, FIG. 5 shows the UE winning contention for access to the channel of the shared radio frequency spectrum band at a time t during the second subframe 510. Upon winning contention for access to the channel of the shared radio frequency spectrum band, the UE may transmit a channel reservation signal to reserve the channel for transmission of at least one uplink transmission (e.g., the first PUSCH and the second PUSCH). The channel reservation signal may include a first channel reservation signal portion 555-*a* and a second channel reservation signal portion 555-*b*. In some examples, the portions of the channel reservation signal may be transmitted between the time t and a next subframe boundary 560.

As shown, there may be resources allocated to the UE for at least one uplink transmission (e.g., the first PUSCH) during the second subframe 510. If access to the channel of the shared radio frequency spectrum band is not won in time to make use of the allocated resources in the second subframe 510, the allocated resources (e.g., resource blocks) may be used for transmission of the channel reservation signal. In this manner, transmission of the channel reservation signal should not interfere with transmissions of other nodes (e.g. the uplink transmissions of other UEs) during the second subframe 510. Alternatively, if access to the channel of the shared radio frequency spectrum band is won in time to make use of the allocated resources in the second subframe 510, the channel reservation signal may be transmitted on only some of the allocated resources, or the channel reservation signal may not be transmitted. When the channel reservation signal is not transmitted, use of the resources allocated for the at least one uplink transmission (e.g., the first PUSCH) may begin immediately, to transmit a part of the first PUSCH (e.g., a partial first PUSCH).

When an SRS 525 is scheduled for transmission at an end of the subframe in which contention for access to the channel of the shared radio frequency spectrum band is won, the SRS 525 may be transmitted instead of the channel reservation signal (e.g., because the SRS 525 may serve as a channel reservation signal).

In some examples, the channel reservation signal may include a U-CUBS. The U-CUBS may be transmitted on the resources allocated to the first PUSCH, between the time t and transmission of the SRS 525.

In a first variation of the timing diagram 500, resources may not be allocated for transmission of the first PUSCH in the second subframe 510, but resources may be allocated for transmission of the SRS 525. In such a variation, a channel reservation signal may be transmitted, between the time t and the next subframe boundary 560, on one or more (or all) of the frequency resources allocated for transmission of the SRS 525.

In a second variation of the timing diagram 500, resources may be allocated for transmission of a PUSCH and an SRS in the second subframe 510, but resources for transmission of the SRS may be allocated at the beginning of the second subframe 510, and may not be used because access to the channel of the shared radio frequency spectrum band has not yet been won. In this variation, a first number of resource blocks allocated for transmission of the SRS, and a second number of resource blocks allocated for transmission of the at least one PUSCH, may be identified. The first number of resource blocks and the second number of resource blocks may then be compared. When the second number of resource blocks exceeds the first number of resource blocks, at least one frequency resource allocated for transmission of the at least one PUSCH may be identified for transmission of a channel reservation signal. When the first number of resource blocks exceeds the second number of resource blocks, at least one frequency resource allocated for transmission of the SRS may be identified for transmission of a channel reservation signal. Alternatively, at least one frequency resource allocated for transmission of the SRS and at least one frequency resource allocated for transmission of the at least one PUSCH may be identified for transmission of a channel reservation signal. In both of the above examples, the channel reservation signal may be transmitted between the time t and the next subframe boundary 560.

Figure 6:
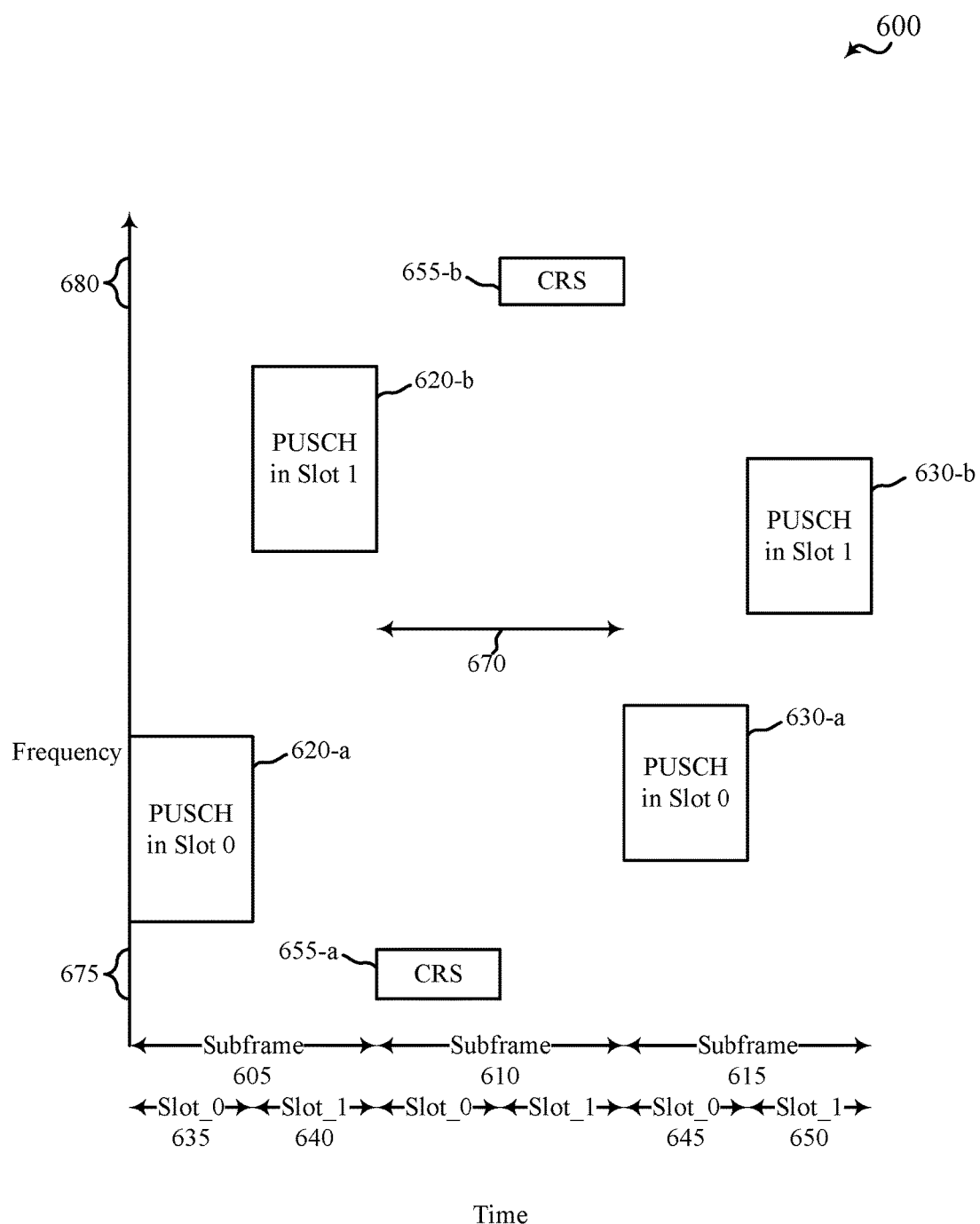
FIG. 6 shows a timing diagram for contending for access to a channel of a shared radio frequency spectrum band, and for reserving the channel, in accordance with various aspects of the present disclosure.

FIG. 6 shows a timing diagram 600 for contending for access to a channel of a shared radio frequency spectrum band, and for reserving the channel, in accordance with various aspects of the present disclosure. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). By way of example, the timing diagram 600 shows examples of transmissions made over three one millisecond (1 ms) subframes (e.g., a first subframe 605, a second subframe 610 following the first subframe 605, and a third subframe 615 following the second subframe 610). Each of the first subframe 605, the second subframe 610, and the third subframe 615 may include a respective first slot and second slot.

A first PUSCH may be scheduled for transmission by a UE in the first subframe 605, and a second PUSCH may be scheduled for transmission by the UE in the third subframe 615. By way of example, the first PUSCH may include a first PUSCH portion 620-*a* scheduled for transmission in a first slot 635 of the first subframe 605, and a second PUSCH portion 620-*b* scheduled for transmission in a second slot 640 of the first subframe 605. Also by way of example, the second PUSCH may include a first PUSCH portion 630-*a* scheduled for transmission in a first slot 645 of the third subframe 615, and a second PUSCH portion 630-*b* scheduled for transmission in a second slot 650 of the third subframe 615.

The various uplink transmissions may be transmitted on overlapping or non-overlapping frequency resources, as well as overlapping or non-overlapping time resources. The resources on which the first PUSCH and the second PUSCH are scheduled for transmission may be allocated, for example, in one or more uplink grants or control signaling (e.g., RRC signaling) received by the UE prior to or during the first subframe 605. The resources may be allocated as frequency resources (e.g., one or more frequency carriers or frequency sub-carriers), time resources (e.g., one or more subframes, slots, or symbol periods), resource blocks (i.e., a block of resources defined by an intersection of frequency resources and time resources), etc. For purposes of illustration, an uplink transmission may not be scheduled during the second subframe 610, and thus a gap between scheduled uplink transmissions (e.g., a gap 670 between the first PUSCH and the second PUSCH) may exist. In some examples, the gap 670 may be provided to allow for transmissions of SRSs by other nodes.

At a time prior to the start of the first subframe 605, the UE may contend for access to a channel of the shared radio frequency spectrum band (e.g., a channel over which the first PUSCH and the second PUSCH are scheduled to be transmitted). In some examples, contending for access may include the performance of a CCA procedure or an ECCA procedure. If the UE does not win contention for access to the channel of the shared radio frequency spectrum band, the first PUSCH and the second PUSCH may not be transmitted. However, by way of example, FIG. 6 assumes the UE has won contention for access to the channel of the shared radio frequency spectrum band prior to the start of the first subframe 605.

To maintain its reservation of the channel during the gap 670, the UE may transmit a channel reservation signal (CRS) that may include a first CRS portion 655-*a* and a second CRS portion 655-*b*. In some examples, a base station may designate (e.g., pre-designate) one or more frequency resources (e.g., first frequency resource(s) 675 and second frequency resource(s) 680) that may be used for transmission of the channel reservation signal. For example, a base station may pre-designate at least one of: a cyclic shift per resource block of a PUCCH (e.g., when using PUCCH Format 1 or Format 2), a code per resource block of a PUCCH (e.g., when using PUCCH Format 3), or a combination thereof. The frequency resource(s) may be pre-designated in one or more uplink grants or control signaling received by the UE.

In some examples, the channel reservation signal may include a U-CUBS. In some examples, the channel reservation signal may include a junk transmission (e.g., a transmission that a base station receiving the junk transmission may ignore).

In some examples, a transmitted U-CUBS may include a copy of a DM-RS scheduled to be transmitted in at least one of: a subframe in which the winning contention for access occurs (e.g., the first subframe 605 or the second subframe 610), a subframe following the first subframe (e.g., the second subframe 610 or the third subframe 615), or a combination thereof. In some examples, the U-CUBS may include at least a portion of a DM-RS sequence or at least a portion of an SRS sequence. For example, when a PUSCH is scheduled to be transmitted in a subframe n+1 following a subframe n in which contention for access to a channel of a shared radio frequency spectrum band is won, the DM-RS to be transmitted in subsequent subframes (e.g., the DM-RS to be transmitted in slots 2n+2, 2n+3, etc. of the subsequent subframe(s)) may be transmitted sequentially until the next subframe boundary, and used as a U-CUBS, assuming that the frequency resources (e.g., resource blocks) needed to transmit the DM-RS sequence are available in the subframe n. Alternatively, a U-CUBS may include the DM-RS to be transmitted in the next subframe, which DM-RS may be repeated until the next subframe boundary.

When a PUSCH is scheduled to be transmitted in a subframe n in which contention for access to a channel of a shared radio frequency spectrum band is won, and in a subframe n+1 following the subframe n, but contention for access to the channel is won in the middle of the subframe n, the DM-RS of the subframe n may be transmitted repeatedly to occupy the channel, or the DM-RS of slots 2n, 2n+1, 2n+2, etc. may be transmitted sequentially until the next subframe boundary, and used as a U-CUBS, assuming that the frequency resources (e.g., resource blocks) needed to transmit the DM-RS sequence are available in the subframe n.

When a U-CUBS is transmitted in a subframe and preceding an SRS, the SRS sequence or a variation thereof may be transmitted until the next subframe boundary, as the U-CUBS.

Figure 7:
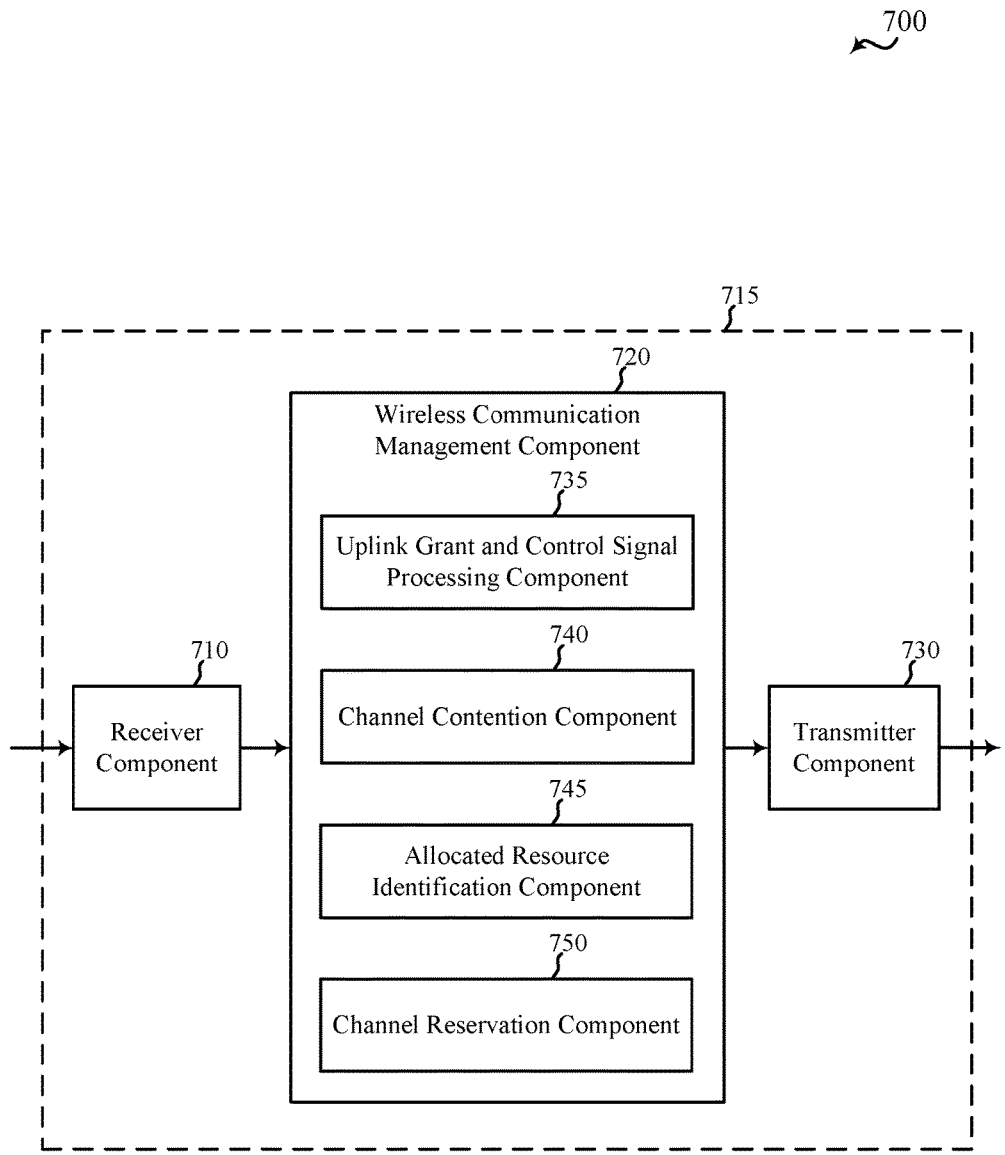
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. The apparatus 715 may be an example of aspects of one or more of the UEs 115, 215, 215-*a*, 215-*b*, or 215-*c* described with reference to FIG. 1 or 2. The apparatus 715 may also be or include a processor. The apparatus 715 may include a receiver component 710, a wireless communication management component 720, or a transmitter component 730. Each of these components may be in communication with each other.

The components of the apparatus 715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 710 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, or 6. The receiver component 710 may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 730 may include at least one RF transmitter, such as at least one RF transmitter operable to transmit over the dedicated radio frequency spectrum band or the shared radio frequency spectrum band. The transmitter component 730 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management component 720 may be used to manage one or more aspects of wireless communication for the apparatus 715. In some examples, the wireless communication management component 720 may include an uplink grant and control signal processing component 735, a channel contention component 740, an allocated resource identification component 745, or a channel reservation component 750.

In some examples, the uplink grant and control signal processing component 735 may be used to receive at a UE (e.g., from a base station) one or more uplink grants or control signaling (e.g., RRC signaling). In some examples, the uplink grant(s) or control signaling may include scheduling information for at least one uplink transmission over a shared radio frequency spectrum band.

In some examples, the channel contention component 740 may be used to contend for access to a channel of the shared radio frequency spectrum band. In some examples, contending for access may include the performance of a CCA procedure or ECCA procedure.

In some examples, the allocated resource identification component 745 may be used to identify a number of frequency resources of the channel of the shared radio frequency spectrum band that are allocated to the UE for at least one uplink transmission following a winning contention for access to the channel of the shared radio frequency spectrum by the channel contention component 740. In some examples, the number of frequency resources may be identified with reference to one or more uplink grants or control signaling received by the uplink grant and control signal processing component 735. In some examples, the identified number of frequency resources may include all of the frequency resources allocated to the UE for the at least one uplink transmission.

In some examples, the channel reservation component 750 may be used to transmit a channel reservation signal using a set of frequency resources associated with the identified number of frequency resources.

In some examples of the apparatus 715, the channel reservation signal may include a U-CUBS. The U-CUBS may be transmitted between the winning contention for access to the channel of the shared radio frequency spectrum band and the at least one uplink transmission. In some examples, the U-CUBS may be transmitted during a first subframe, and the at least one uplink transmission may be transmitted during at least one subframe following the first subframe. In some examples, the U-CUBS or junk transmission may be transmitted in a same subframe as the at least one uplink transmission. In some examples, the U-CUBS may include a copy of a DM-RS scheduled to be transmitted in at least one of: a first subframe in which the winning contention for access occurs, a second subframe following the first subframe, or a combination thereof. In some examples, the U-CUBS may include at least a portion of a DM-RS sequence or at least a portion of an SRS sequence.

In some examples of the apparatus 715, at least one PUSCH may be scheduled for transmission following the winning contention for access. In these examples, the allocated resource identification component 745's identification of the number of frequency resources that are allocated to the UE for the at least one uplink transmission may include an identification of at least one frequency resource allocated to a first PUSCH. The first PUSCH may be scheduled for transmission in a first slot and/or a second slot of a subframe. In some examples, the allocated resource identification component 745's identification of the number of frequency resources that are allocated to the first PUSCH may include an identification of at least one of a first number of frequency resources on which the first PUSCH is scheduled for transmission in a first slot of a subframe, and/or an identification of at least one of a second number of frequency resources on which the second PUSCH is scheduled for transmission in a second slot of a subframe. In some examples, scheduling information for the at least one PUSCH may be received in at least one uplink grant or control signaling received by the uplink grant and control signal processing component 735.

In some examples of the apparatus 715, at least one PUSCH and at least one PUCCH may be scheduled for transmission following the winning contention for access. In these examples, the allocated resource identification component 745's identification of the number of frequency resources that are allocated to the UE for the at least one uplink transmission may include an identification of at least one frequency resource allocated for transmission of the at least one PUSCH, but no identification of any frequency resource allocated to the at least one PUCCH. In some examples, scheduling information for the at least one PUSCH or the at least one PUCCH may be received in at least one uplink grant or control signaling received by the uplink grant and control signal processing component 735.

In some examples of the apparatus 715, the at least one uplink transmission may include an SRS, and the allocated resource identification component 745's identification of the number of frequency resources that are allocated to the UE for the at least one uplink transmission may include an identification of a number of frequency resources (or resource blocks) allocated for transmission of the SRS.

Figure 8:
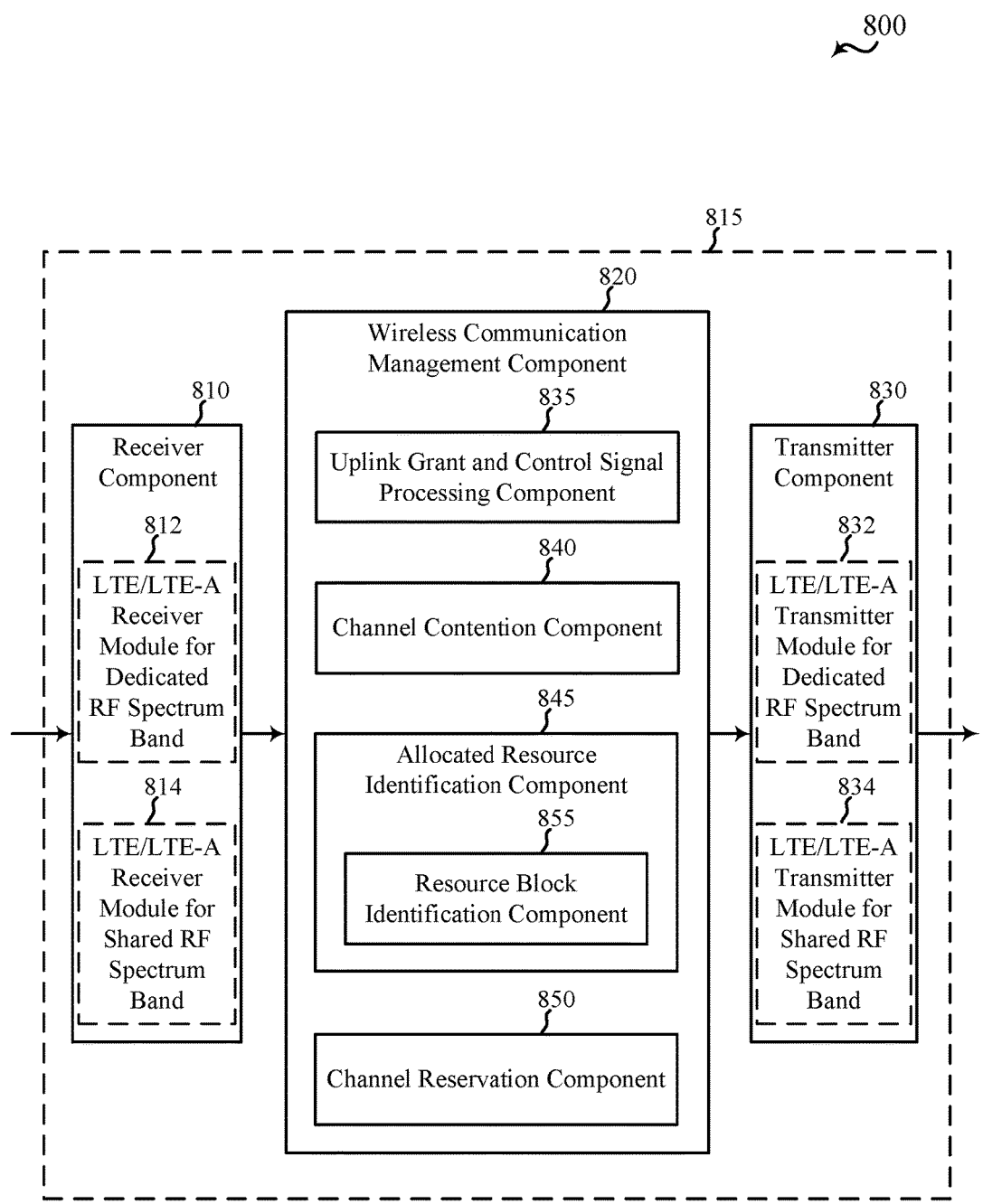
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs 115, 215, 215-*a*, 215-*b*, or 215-*c* described with reference to FIG. 1 or 2, or aspects of the apparatus 715 described with reference to FIG. 7. The apparatus 815 may also be or include a processor. The apparatus 815 may include a receiver component 810, a wireless communication management component 820, or a transmitter component 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 810 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, or 6. The receiver component 810 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 812), and an LTE/LTE-A receiver component for communicating over the shared radio frequency spectrum band (e.g., LTE/LTE-A receiver component for shared RF spectrum band 814). The receiver component 810, including the LTE/LTE-A receiver component for dedicated RF spectrum band 812 or the LTE/LTE-A receiver component for shared RF spectrum band 814, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 830 may include at least one RF transmitter, such as at least one RF transmitter operable to transmit over the dedicated radio frequency spectrum band or the shared radio frequency spectrum band. The transmitter component 830 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 832), and an LTE/LTE-A transmitter component for communicating over the shared radio frequency spectrum band (e.g., LTE/LTE-A transmitter component for shared RF spectrum band 834). The transmitter component 830, including the LTE/LTE-A transmitter component for dedicated RF spectrum band 832 or the LTE/LTE-A transmitter component for shared RF spectrum band 834, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the wireless communication management component 820 may be used to manage one or more aspects of wireless communication for the apparatus 815. In some examples, the wireless communication management component 820 may include an uplink grant and control signal processing component 835, a channel contention component 840, an allocated resource identification component 845, or a channel reservation component 850.

In some examples, the uplink grant and control signal processing component 835 may be used to receive at a UE (e.g., from a base station) one or more uplink grants or control signaling (e.g., RRC signaling). In some examples, the uplink grant(s) or control signaling may include scheduling information for at least one uplink transmission over a shared radio frequency spectrum band.

In some examples, the channel contention component 840 may be used to contend for access to a channel of the shared radio frequency spectrum band. In some examples, contending for access may include the performance of a CCA procedure or ECCA procedure.

In some examples, the allocated resource identification component 845 may include a resource block identification component 855. The resource block identification component 855 may be used to identify a number of resource blocks of the channel of the shared radio frequency spectrum band that are allocated to the UE for at least one uplink transmission following a winning contention for access to the channel of the shared radio frequency spectrum by the channel contention component 840. Identifying the number of resource blocks may explicitly or implicitly include identifying a number of frequency resources allocated to the UE for the at least one uplink transmission. In some examples, the number of resource blocks (or number of frequency resources) may be identified with reference to one or more uplink grants or control signaling received by the uplink grant and control signal processing component 835. In some examples, the identified number of resource blocks may include all of the resource blocks allocated to the UE for the at least one uplink transmission.

In some examples, the channel reservation component 850 may be used to transmit a channel reservation signal on the identified number of resource blocks.

In some examples of the apparatus 815, the channel reservation signal may include a U-CUBS. In some examples, the U-CUBS may include a copy of a DM-RS scheduled to be transmitted in at least one of: a first subframe in which the winning contention for access occurs, a second subframe following the first subframe, or a combination thereof. In some examples, the U-CUBS may include at least a portion of a DM-RS sequence or at least a portion of an SRS sequence.

In some examples of the apparatus 815, the number of resource blocks may be identified in at least one PUSCH. In the same or other examples, the number of resource blocks may be identified in a subframe in which the winning contention for access occurs.

Figure 9:
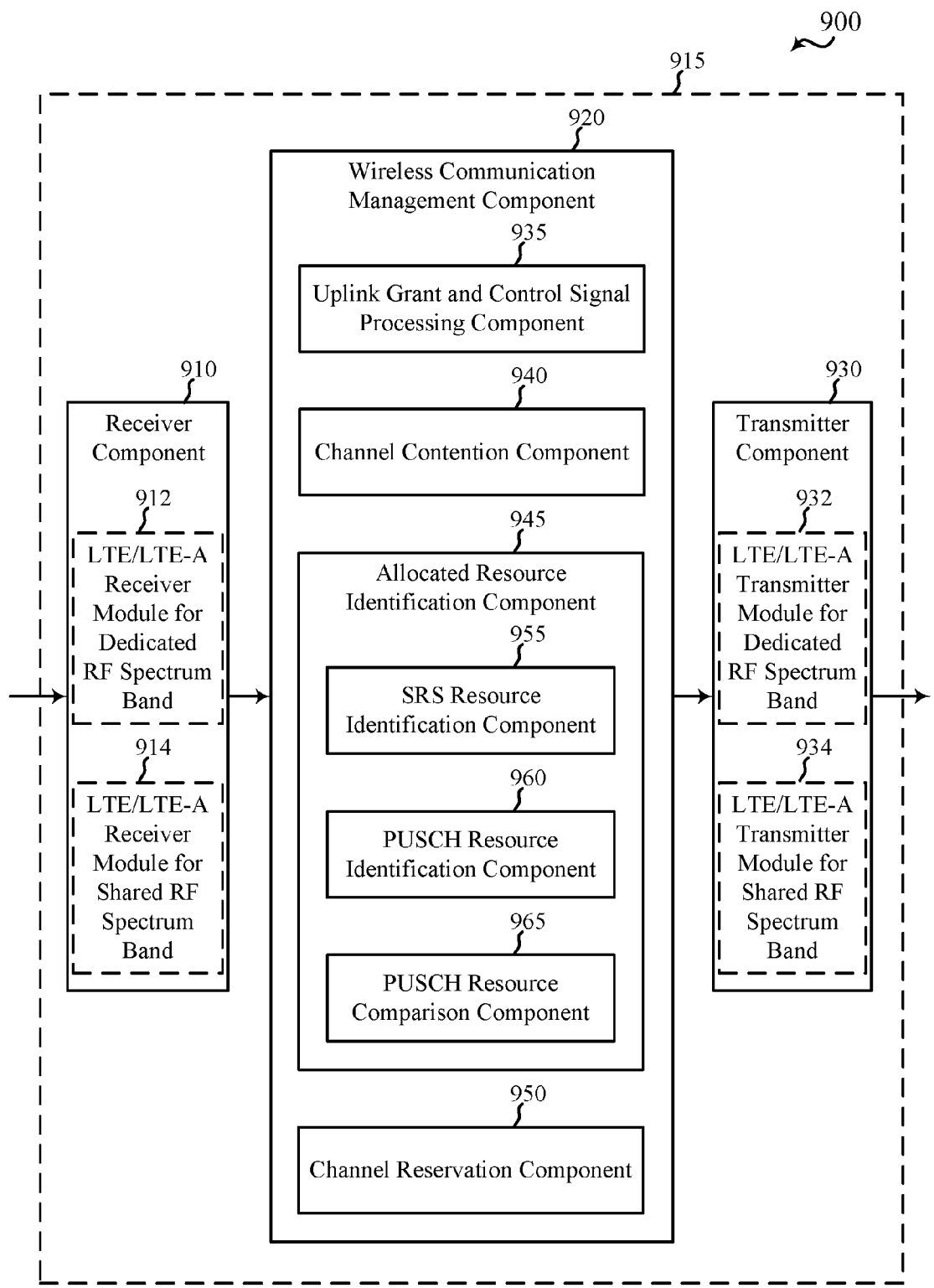
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs 115, 215, 215-a, 215-b, or 215-c described with reference to FIG. 1 or 2, or aspects of the apparatus 715 or 815 described with reference to FIG. 7 or 8. The apparatus 915 may also be or include a processor. The apparatus 915 may include a receiver component 910, a wireless communication management component 920, or a transmitter component 930. Each of these components may be in communication with each other.

The components of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 910 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, or 6. The receiver component 910 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 912), and an LTE/LTE-A receiver component for communicating over the shared radio frequency spectrum band (e.g., LTE/LTE-A receiver component for shared RF spectrum band 914). The receiver component 910, including the LTE/LTE-A receiver component for dedicated RF spectrum band 912 or the LTE/LTE-A receiver component for shared RF spectrum band 914, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 930 may include at least one RF transmitter, such as at least one RF transmitter operable to transmit over the dedicated radio frequency spectrum band or the shared radio frequency spectrum band. The transmitter component 930 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 932), and an LTE/LTE-A transmitter component for communicating over the shared radio frequency spectrum band (e.g., LTE/LTE-A transmitter component for shared RF spectrum band 934). The transmitter component 930, including the LTE/LTE-A transmitter component for dedicated RF spectrum band 932 or the LTE/LTE-A transmitter component for shared RF spectrum band 934, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the wireless communication management component 920 may be used to manage one or more aspects of wireless communication for the apparatus 915. In some examples, the wireless communication management component 920 may include an uplink grant and control signal processing component 935, a channel contention component 940, an allocated resource identification component 945, or a channel reservation component 950.

In some examples, the uplink grant and control signal processing component 935 may be used to receive at a UE (e.g., from a base station) one or more uplink grants or control signaling (e.g., RRC signaling). In some examples, the uplink grant(s) or control signaling may include scheduling information for at least one uplink transmission over a shared radio frequency spectrum band.

In some examples, the channel contention component 940 may be used to contend for access to a channel of the shared radio frequency spectrum band. In some examples, contending for access may include the performance of a CCA procedure or ECCA procedure.

In some examples, the allocated resource identification component 945 may be used to identify a number of resource resources of the channel of the shared radio frequency spectrum band (or resource blocks) that are allocated to the UE for at least one uplink transmission. In some examples, the identified number of frequency resources may include all of the frequency resources allocated to the UE for the at least one uplink transmission. In some examples, the at least one uplink transmission may follow a winning contention for access to the channel of the shared radio frequency spectrum by the channel contention component 940. In some examples, part or all of the at least one uplink transmission may precede the winning contention for access, and may not be made despite resources having been allocated to the UE. In some examples, the number of frequency resources may be identified with reference to one or more uplink grants or control signaling received by the uplink grant and control signal processing component 935. In some examples, the at least one uplink transmission may include an SRS and at least one PUSCH. In some examples, the SRS may be scheduled for transmission in a first symbol of a subframe.

In some examples, the allocated resource identification component 945 may include an SRS resource identification component 955, a PUSCH resource identification component 960, or a resource comparison component 965. The SRS resource identification component 955 may be used to identify a first number of resource blocks allocated for transmission of the SRS. The PUSCH resource identification component 960 may be used to identify a second number of resource blocks allocated for transmission of the at least one PUSCH. The resource comparison component 965 may be used to compare the first number of resource blocks to the second number of resource blocks (e.g., to determine whether the first number of resource blocks exceeds the second number of resource blocks).

When the second number of resource blocks exceeds the first number of resource blocks, the allocated resource identification component 945 may be used to identify at least one frequency resource allocated for transmission of the at least one PUSCH. When the first number of resource blocks exceeds the second number of resource blocks, the allocated resource identification component 945 may be used to identify at least one frequency resource allocated for transmission of the SRS. Alternatively, the allocated resource identification component 945 may identify at least one frequency resource allocated for transmission of the at least one PUSCH and at least one frequency resource allocated for transmission of the SRS (and in some examples, all of the frequency resources allocated for transmission of the at least one PUSCH and the SRS).

In some examples, the channel reservation component 950 may be used to transmit a channel reservation signal on the identified number of resource blocks.

In some examples of the apparatus 915, the channel reservation signal may include a U-CUBS. The U-CUBS may be transmitted between the winning contention for access to the channel of the shared radio frequency spectrum band and the at least one uplink transmission. The U-CUBS may also or alternatively be transmitted on resource blocks allocated to the at least one uplink transmission. In some examples, the U-CUBS may include a copy of a DM-RS scheduled to be transmitted in at least one of: a first subframe in which the winning contention for access occurs, a second subframe following the first subframe, or a combination thereof. In some examples, the U-CUBS may include at least a portion of a DM-RS sequence or at least a portion of an SRS sequence.

Figure 10:
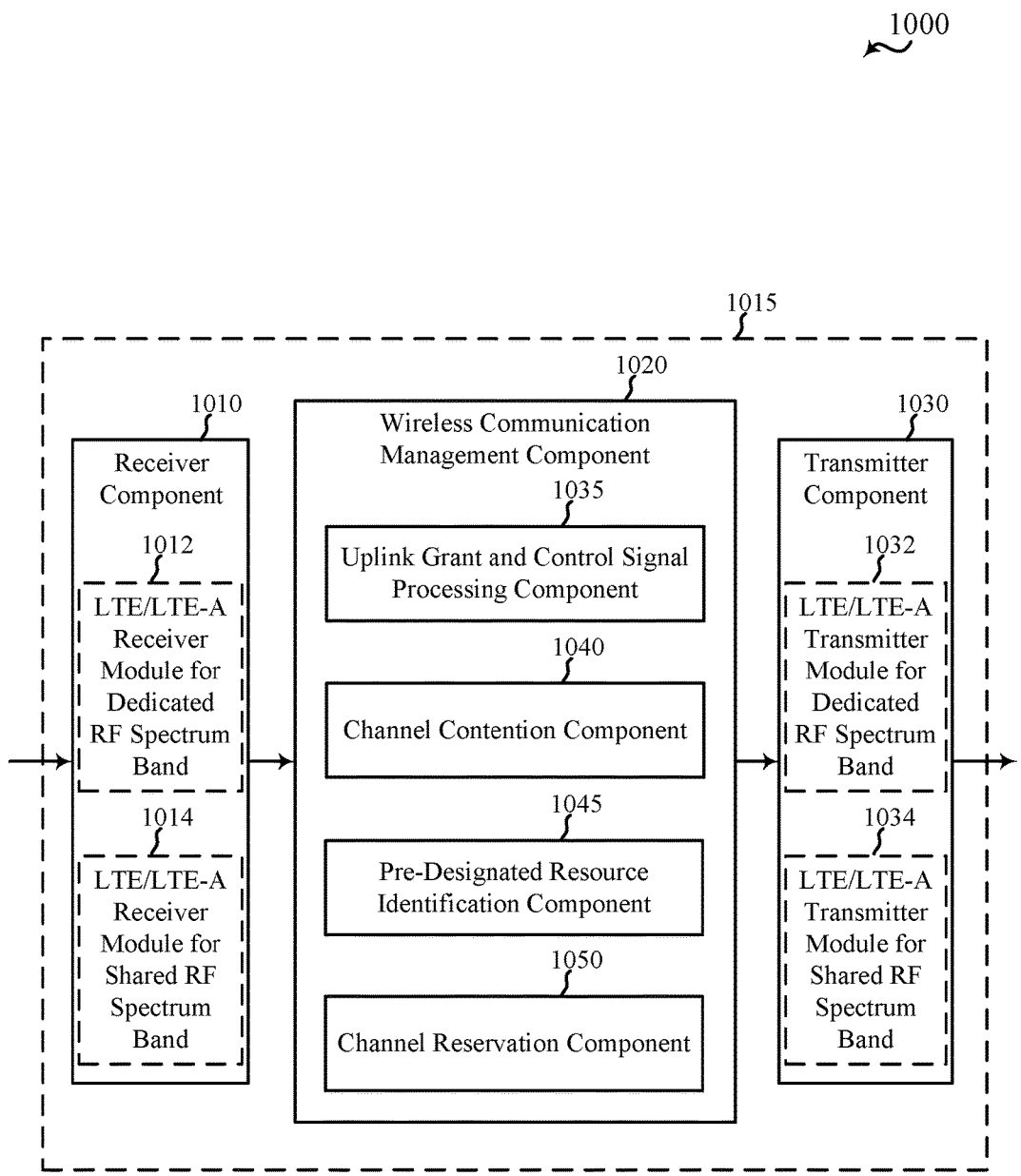
FIG. 10 shows a block diagram of an apparatus for use in wireless communication, in accordance with various aspects of the present disclosure.

FIG. 10 shows a block diagram 1000 of an apparatus 1015 for use in wireless communication, in accordance with various aspects of the present disclosure. The apparatus 1015 may be an example of aspects of one or more of the UEs 115, 215, 215-*a*, 215-*b*, or 215-*c* described with reference to FIG. 1 or 2, or aspects of the apparatus 715, 815, or 915 described with reference to FIG. 7, 8, or 9. The apparatus 1015 may also be or include a processor. The apparatus 1015 may include a receiver component 1010, a wireless communication management component 1020, or a transmitter component 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1010 may include at least one RF receiver, such as at least one RF receiver operable to receive transmissions over a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, or 6. The receiver component 1010 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 1012), and an LTE/LTE-A receiver component for communicating over the shared radio frequency spectrum band (e.g., LTE/LTE-A receiver component for shared RF spectrum band 1014). The receiver component 1010, including the LTE/LTE-A receiver component for dedicated RF spectrum band 1012 or the LTE/LTE-A receiver component for shared RF spectrum band 1014, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 1030 may include at least one RF transmitter, such as at least one RF transmitter operable to transmit over the dedicated radio frequency spectrum band or the shared radio frequency spectrum band. The transmitter component 1030 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 1032), and an LTE/LTE-A transmitter component for communicating over the shared radio frequency spectrum band (e.g., LTE/LTE-A transmitter component for shared RF spectrum band 1034). The transmitter component 1030, including the LTE/LTE-A transmitter component for dedicated RF spectrum band 1032 or the LTE/LTE-A transmitter component for shared RF spectrum band 1034, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the wireless communication management component 1020 may be used to manage one or more aspects of wireless communication for the apparatus 1015. In some examples, the wireless communication management component 1020 may include an uplink grant and control signal processing component 1035, a channel contention component 1040, a pre-designated resource identification component 1045, or a channel reservation component 1050.

In some examples, the uplink grant and control signal processing component 1035 may be used to receive at a UE (e.g., from a base station) one or more uplink grants or control signaling (e.g., RRC signaling). In some examples, the uplink grant(s) or control signaling may indicate a number of frequency resources (or resource blocks) of the channel of the shared radio frequency spectrum band that are designated for transmission of a channel reservation signal.

In some examples, the channel contention component 1040 may be used to contend for access to a channel of the shared radio frequency spectrum band. In some examples, contending for access may include the performance of a CCA procedure or ECCA procedure.

In some examples, the pre-designated resource identification component 1045 may be used to identify a number of frequency resources of the channel of the shared radio frequency spectrum band that are pre-designated by a base station for transmission of a channel reservation signal. In some examples, the number of pre-designated frequency resources may be identified with reference to one or more uplink grants or control signaling received by the uplink grant and control signal processing component 1035.

In some examples, the channel reservation component 1050 may be used to transmit a channel reservation signal on the identified number of resource blocks.

In some examples of the apparatus 1015, the channel reservation signal may include a U-CUBS. In some examples, the channel reservation signal may include a junk transmission (e.g., a transmission that a base station receiving the junk transmission may ignore). The U-CUBS or junk transmission may be transmitted by the apparatus 1015 between winning contention for access to the channel of the shared radio frequency spectrum band and at least one uplink transmission following the winning contention for access. The U-CUBS or junk transmission may also or alternatively be transmitted during a gap in the at least one uplink transmission. In some examples, the U-CUBS or junk transmission may be transmitted during a first subframe, and the at least one uplink transmission may be transmitted during at least one subframe following the first subframe. In some examples, the U-CUBS or junk transmission may be transmitted in a same subframe as the at least one uplink transmission. In some examples, the U-CUBS may include a copy of a DM-RS scheduled to be transmitted in at least one of: a first subframe in which the winning contention for access occurs, a second subframe following the first subframe, or a combination thereof. In some examples, the U-CUBS may include at least a portion of a DM-RS sequence or at least a portion of an SRS sequence.

In some examples of the apparatus 1015, the number of frequency resources pre-designated by the base station may include at least one of: a cyclic shift per resource block of a PUCCH, a code per resource block of the PUCCH, or a combination thereof.

In some examples, aspects of two or more of the apparatuses 715, 815, 915, or 1015 described with reference to FIG. 7, 8, 9, or 10 may be combined.

Figure 11:
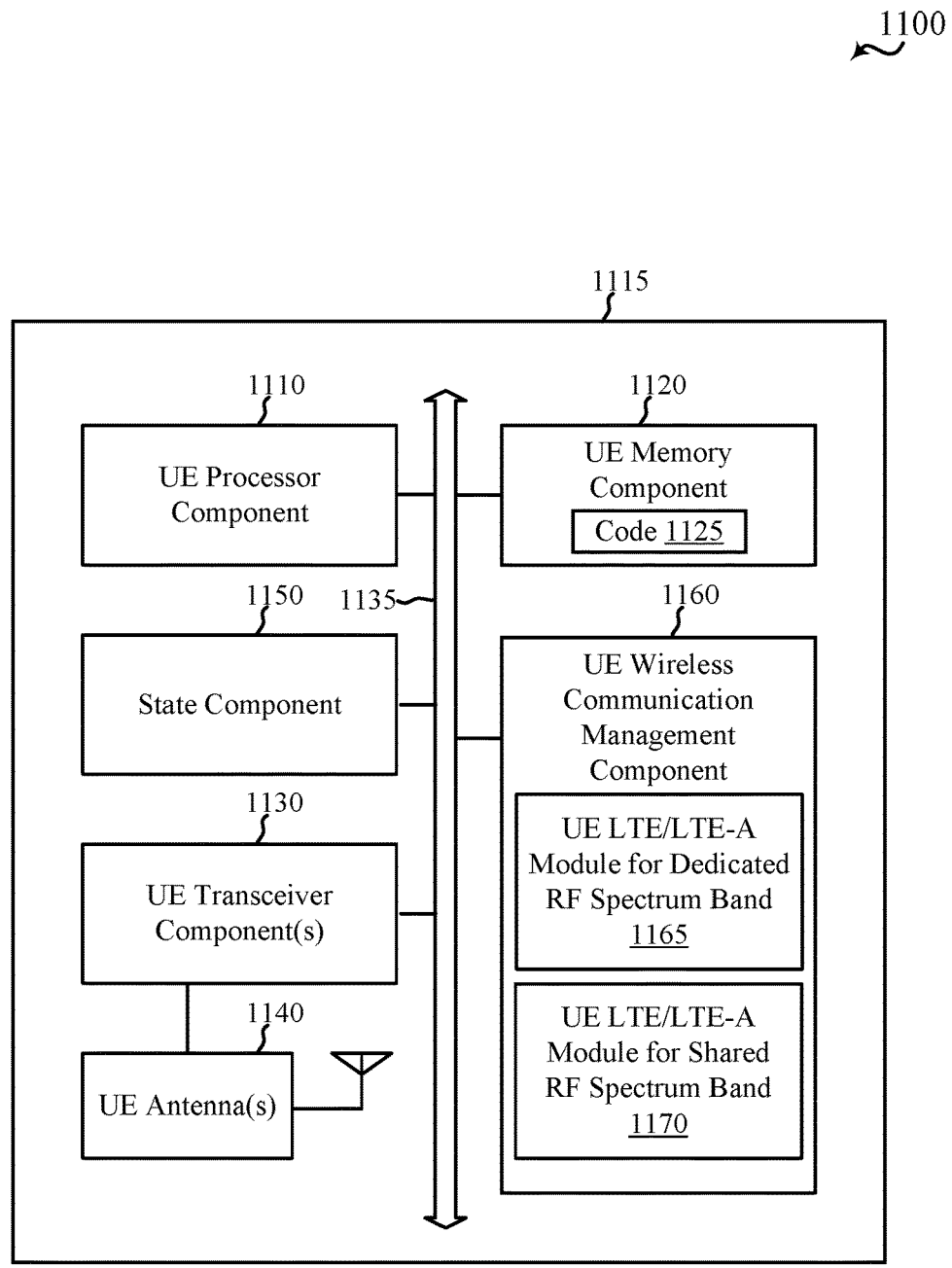
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs 115, 215, 215-a, 215-b, or 215-c described with reference to FIG. 1 or 2, or aspects of one or more of the apparatuses 715, 815, 915, or 1015 described with reference to FIG. 7, 8, 9, or 10. The UE 1115 may be configured to implement at least some of the UE or apparatus features and functions described with reference to FIG. 1, 2, 3, 4, 5, 6, 7, 8, 9, or 10.

The UE 1115 may include a UE processor component 1110, a UE memory component 1120, at least one UE transceiver component (represented by UE transceiver component(s) 1130), at least one UE antenna (represented by UE antenna(s) 1140), or a UE wireless communication management component 1160. Each of these components may be in communication with each other, directly or indirectly, over one or more buses 1135.

The UE memory component 1120 may include random access memory (RAM) or read-only memory (ROM). The UE memory component 1120 may store computer-readable, computer-executable code 1125 containing instructions that are configured to, when executed, cause the UE processor component 1110 to perform various functions described herein related to wireless communication, including the transmission of a channel reservation signal. Alternatively, the code 1125 may not be directly executable by the UE processor component 1110 but be configured to cause the UE 1115 (e.g., when compiled and executed) to perform various of the functions described herein.

The UE processor component 1110 may include an intelligent hardware device, e.g., a central processing unit (CPU), a microcontroller, an ASIC, etc. The UE processor component 1110 may process information received through the UE transceiver component(s) 1130 or information to be sent to the UE transceiver component(s) 1130 for transmission through the UE antenna(s) 1140. The UE processor component 1110 may handle, alone or in connection with the UE wireless communication management component 1160, various aspects of communicating over (or managing communications over) a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The UE transceiver component(s) 1130 may include a modem configured to modulate packets and provide the modulated packets to the UE antenna(s) 1140 for transmission, and to demodulate packets received from the UE antenna(s) 1140. The UE transceiver component(s) 1130 may, in some examples, be implemented as one or more UE transmitter component(s) and one or more separate UE receiver component(s). The UE transceiver component(s) 1130 may support communications in the licensed radio frequency spectrum band or the unlicensed radio frequency spectrum band. The UE transceiver component(s) 1130 may be configured to communicate bi-directionally, via the UE antenna(s) 1140, with one or more of the base stations 105, 205, 205-a, or 1205 described with reference to FIG. 1, 2, or 12. While the UE 1115 may include a single UE antenna, there may be examples in which the UE 1115 may include multiple UE antennas 1140.

The UE state component 1150 may be used, for example, to manage transitions of the UE 1115 between an RRC idle state and an RRC connected state, and may be in communication with other components of the UE 1115, directly or indirectly, over the one or more buses 1135. The UE state component 1150, or portions of it, may include a processor, or some or all of the functions of the UE state component 1150 may be performed by the UE processor component 1110 or in connection with the UE processor component 1110.

The UE wireless communication management component 1160 may be configured to perform or control some or all of the UE or apparatus features or functions described with reference to FIG. 1, 2, 3, 4, 5, 6, 7, 8, 9, or 10 related to wireless communication over the dedicated radio frequency spectrum band or the shared radio frequency spectrum band. For example, the UE wireless communication management component 1160 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication management component 1160 may include a UE LTE/LTE-A component for dedicated RF spectrum band 1165 configured to handle LTE/LTE-A communications in the dedicated radio frequency spectrum band, and a UE LTE/LTE-A component for shared RF spectrum band 1170 configured to handle LTE/LTE-A communications in the shared radio frequency spectrum band. The UE wireless communication management component 1160, or portions of it, may include a processor, or some or all of the functions of the UE wireless communication management component 1160 may be performed by the UE processor component 1110 or in connection with the UE processor component 1110. In some examples, the UE wireless communication management component 1160 may be an example of the wireless communication management component 720, 820, 920, or 1020 described with reference to FIG. 7, 8, 9, or 10.

Figure 12:
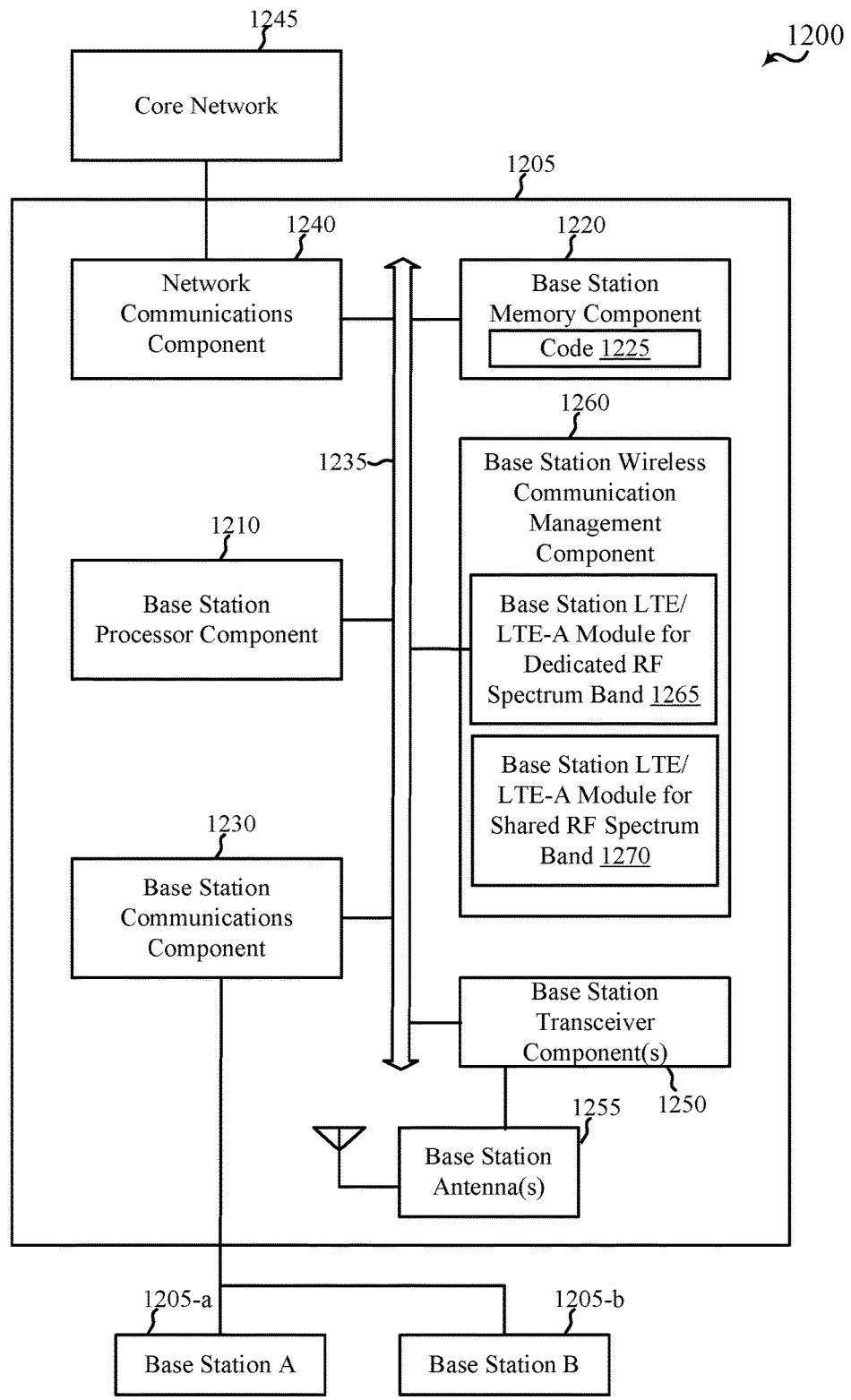
FIG. 12 shows a block diagram of a base station (e.g., a base station forming part or all of an eNB) for use in wireless communication, in accordance with various aspects of the present disclosure.

FIG. 12 shows a block diagram 1200 of a base station 1205 (e.g., a base station forming part or all of an eNB) for use in wireless communication, in accordance with various aspects of the present disclosure. In some examples, the base station 1205 may be an example of one or more aspects of the base station 105, 205, or 205-a described with reference to FIG. 1 or 2. The base station 1205 may be configured to implement or facilitate at least some of the base station features and functions described with reference to FIG. 1, 2, 3, 4, 5, 6, 7, 8, 9, or 10.

The base station 1205 may include a base station processor component 1210, a base station memory component 1220, at least one base station transceiver component (represented by base station transceiver component(s) 1250), at least one base station antenna (represented by base station antenna(s) 1255), or a base station wireless communication management component 1260. The base station 1205 may also include one or more of a base station communications component 1230 or a network communications component 1240. Each of these components may be in communication with each other, directly or indirectly, over one or more buses 1235.

The base station memory component 1220 may include RAM or ROM. The base station memory component 1220 may store computer-readable, computer-executable code 1225 containing instructions that are configured to, when executed, cause the base station processor component 1210 to perform various functions described herein related to wireless communication, including the transmission of uplink grants or RRC signaling to a UE. Alternatively, the computer-readable, computer-executable code 1225 may not be directly executable by the base station processor component 1210 but be configured to cause the base station 1205 (e.g., when compiled and executed) to perform various of the functions described herein.

The base station processor component 1210 may include an intelligent hardware device, e.g., a CPU, a microcontroller, an ASIC, etc. The base station processor component 1210 may process information received through the base station transceiver component(s) 1250, the base station communications component 1230, or the network communications component 1240. The base station processor component 1210 may also process information to be sent to the transceiver component(s) 1250 for transmission through the antenna(s) 1255, to the base station communications component 1230, for transmission to one or more other base stations 1205-a and 1205-b, or to the network communications component 1240 for transmission to a core network 1245, which may be an example of one or more aspects of the core network 130 described with reference to FIG. 1. The base station processor component 1210 may handle, alone or in connection with the base station wireless communication management component 1260, various aspects of communicating over (or managing communications over) a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

The base station transceiver component(s) 1250 may include a modem configured to modulate packets and provide the modulated packets to the base station antenna(s) 1255 for transmission, and to demodulate packets received from the base station antenna(s) 1255. The base station transceiver component(s) 1250 may, in some examples, be implemented as one or more base station transmitter component(s) and one or more separate base station receiver components. The base station transceiver component(s) 1250 may support communications in the dedicated radio frequency spectrum band or the shared radio frequency spectrum band. The base station transceiver component(s) 1250 may be configured to communicate bi-directionally, via the antenna(s) 1255, with one or more UEs or apparatuses, such as one or more of the UEs 115, 215, 215-a, 215-b, 215-c, or 1115 described with reference to FIG. 1, 2, or 11, or one or more of the apparatuses 715, 815, 915, or 1015 described with reference to FIG. 7, 8, 9, or 10. The base station 1205 may, for example, include multiple base station antennas 1255 (e.g., an antenna array). The base station 1205 may communicate with the core network 1245 through the network communications component 1240. The base station 1205 may also communicate with other base stations, such as the base stations 1205-*a* and 1205-*b*, using the base station communications component 1230.

The base station wireless communication management component 1260 may be configured to perform or control some or all of the features or functions described with reference to FIG. 1, 2, 3, 4, 5, 6, 7, 8, 9, or 10 related to wireless communication over the dedicated radio frequency spectrum band or the shared radio frequency spectrum band. For example, the base station wireless communication management component 1260 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication management component 1260 may include a base station LTE/LTE-A component for dedicated RF spectrum band 1265 configured to handle LTE/LTE-A communications in the dedicated radio frequency spectrum band, and a base station LTE/LTE-A component for shared RF spectrum band 1270 configured to handle LTE/LTE-A communications in the shared radio frequency spectrum band. The base station wireless communication management component 1260, or portions of it, may include a processor, or some or all of the functions of the base station wireless communication management component 1260 may be performed by the base station processor component 1210 or in connection with the base station processor component 1210.

Figure 13:
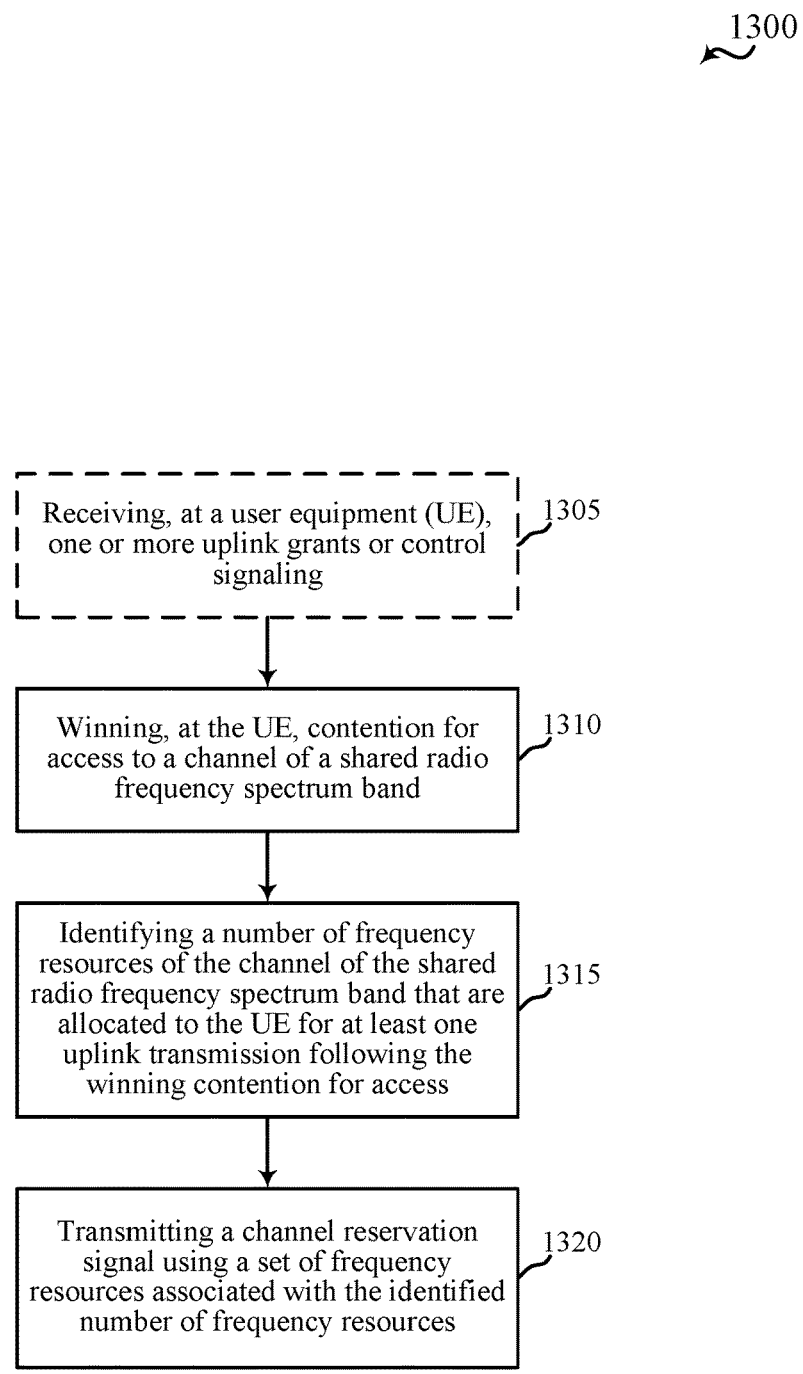
FIG. 13 is a flow chart illustrating an exemplary method for wireless communication, in accordance with various aspects of the present disclosure.

FIG. 13 is a flow chart illustrating an exemplary method 1300 for wireless communication, in accordance with various aspects of the present disclosure. For clarity, the method 1300 is described below with reference to aspects of one or more of the UEs 115, 215, 215-*a*, 215-*b*, 215-*c*, or 1115 described with reference to FIG. 1, 2, or 11, or aspects of one or more of the apparatuses 715, 815, 915, or 1015 described with reference to FIG. 7, 8, 9, or 10. In some examples, UE or apparatus may execute one or more sets of codes to control the functional elements of the UE or apparatus to perform the functions described below. Additionally or alternatively, the UE or apparatus may perform one or more of the functions described below using special-purpose hardware.

At block 1305, the method 1300 may optionally include receiving at a UE (e.g., from a base station) one or more uplink grants or control signaling (e.g., RRC signaling). In some examples, the uplink grant(s) or control signaling may include scheduling information for at least one uplink transmission over a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the operation(s) at block 1305 may be performed using the wireless communication management component 720, 820, 920, 1020, or 1160 described with reference to FIG. 7, 8, 9, 10, or 11, or the uplink grant and control signal processing component 735, 835, 935, or 1035 described with reference to FIG. 7, 8, 9, or 10.

At block 1310, the method 1300 may include winning, at a UE, contention for access to a channel of the shared radio frequency spectrum band. In some examples, the operation(s) at block 1310 may be performed using the wireless communication management component 720, 820, 920, 1020, or 1160 described with reference to FIG. 7, 8, 9, 10, or 11, or the channel contention component 740, 840, 940, or 1040 described with reference to FIG. 7, 8, 9, or 10.

At block 1315, the method 1300 may include identifying a number of frequency resources of the channel of the shared radio frequency spectrum band that are allocated to the UE for at least one uplink transmission following the winning contention for access. In some examples, the number of frequency resources may be identified with reference to one or more uplink grants or control signaling received at block 1305. In some examples, the identified number of frequency resources may include all of the frequency resources allocated to the UE for the at least one uplink transmission. In some examples, the operation(s) at block 1315 may be performed using the wireless communication management component 720, 820, 920, 1020, or 1160 described with reference to FIG. 7, 8, 9, 10, or 11, or the allocated resource identification component 745, 845, or 945 described with reference to FIG. 7, 8, or 9.

At block 1320, the method 1300 may include transmitting a channel reservation signal using a set of frequency resources associated with the identified number of frequency resources. In some examples, the operation(s) at block 1320 may be performed using the wireless communication management component 720, 820, 920, 1020, or 1160 described with reference to FIG. 7, 8, 9, 10, or 11, or the channel reservation component 750, 850, 950, or 1050 described with reference to FIG. 7, 8, 9, or 10.

In some examples of the method 1300, the channel reservation signal may include a U-CUBS. The U-CUBS may be transmitted between the winning contention for access to the channel of the shared radio frequency spectrum band and the at least one uplink transmission. In some examples, the U-CUBS may be transmitted during a first subframe, and the at least one uplink transmission may be transmitted during at least one subframe following the first subframe. In some examples, the U-CUBS or junk transmission may be transmitted in a same subframe as the at least one uplink transmission. In some examples, the U-CUBS may include a copy of a DM-RS scheduled to be transmitted in at least one of: a first subframe in which the winning contention for access occurs, a second subframe following the first subframe, or a combination thereof. In some examples, the U-CUBS may include at least a portion of a DM-RS sequence or at least a portion of an SRS sequence.

In some examples of the method 1300, at least one PUSCH may be scheduled for transmission following the winning contention for access. In these examples, identifying the number of frequency resources that are allocated to the UE for the at least one uplink transmission may include identifying at least one frequency resource allocated to a first PUSCH. The first PUSCH may be scheduled for transmission in a first slot and/or a second slot of a subframe. In some examples, identifying the number of frequency resources that are allocated to the first PUSCH may include identifying at least one of a first number of frequency resources on which the first PUSCH is scheduled for transmission in a first slot of a subframe, and/or identifying at least one of a second number of frequency resources on which the second PUSCH is scheduled for transmission in a second slot of a subframe. In some examples, scheduling information for the at least one PUSCH may be received in at least one uplink grant or control signaling received at block 1305.

In some examples of the method 1300, at least one PUSCH and at least one PUCCH may be scheduled for transmission following the winning contention for access. In these examples, identifying the number of frequency resources that are allocated to the UE for the at least one uplink transmission may include identifying at least one frequency resource allocated for transmission of the at least one PUSCH, but not identifying a frequency resource allocated to the at least one PUCCH. In some examples, scheduling information for the at least one PUSCH or the at least one PUCCH may be received in at least one uplink grant or control signaling received at block 1305.

In some examples of the method 1300, the at least one uplink transmission may include an SRS, and identifying the number of frequency resources that are allocated to the UE for the at least one uplink transmission may include identifying a number of frequency resources (or resource blocks) allocated for transmission of the SRS.

Thus, the method 1300 may provide for wireless communication. It should be noted that the method 1300 is just one implementation and that the operations of the method 1300 may be rearranged or otherwise modified such that other implementations are possible.

Figure 14:
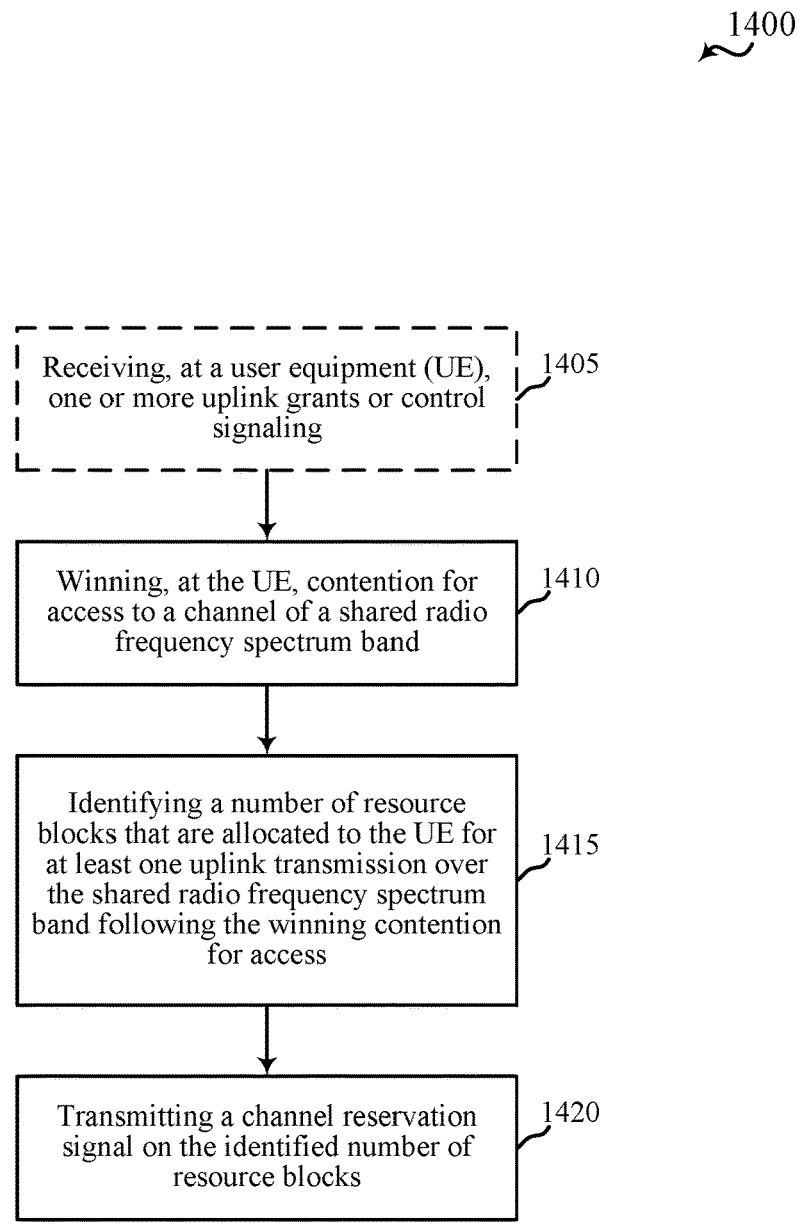
FIG. 14 is a flow chart illustrating an exemplary method for wireless communication, in accordance with various aspects of the present disclosure.

FIG. 14 is a flow chart illustrating an exemplary method 1400 for wireless communication, in accordance with various aspects of the present disclosure. For clarity, the method 1400 is described below with reference to aspects of one or more of the UEs 115, 215, 215-*a*, 215-*b*, 215-*c*, or 1115 described with reference to FIG. 1, 2, or 11, or aspects of one or more of the apparatuses 715, 815, 915, or 1015 described with reference to FIG. 7, 8, 9, or 10. In some examples, UE or apparatus may execute one or more sets of codes to control the functional elements of the UE or apparatus to perform the functions described below. Additionally or alternatively, the UE or apparatus may perform one or more of the functions described below using special-purpose hardware.

At block 1405, the method 1400 may optionally include receiving at a UE (e.g., from a base station) one or more uplink grants or control signaling (e.g., RRC signaling). In some examples, the uplink grant(s) or control signaling may include scheduling information for at least one uplink transmission over a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the operation(s) at block 1405 may be performed using the wireless communication management component 720, 820, 920, 1020, or 1160 described with reference to FIG. 7, 8, 9, 10, or 11, or the uplink grant and control signal processing component 735, 835, 935, or 1035 described with reference to FIG. 7, 8, 9, or 10.

At block 1410, the method 1400 may include winning, at a UE, contention for access to a channel of the shared radio frequency spectrum band. In some examples, the operation(s) at block 1410 may be performed using the wireless communication management component 720, 820, 920, 1020, or 1160 described with reference to FIG. 7, 8, 9, 10, or 11, or the channel contention component 740, 840, 940, or 1040 described with reference to FIG. 7, 8, 9, or 10.

At block 1415, the method 1400 may include identifying a number of resource blocks that are allocated to the UE for at least one uplink transmission over the shared radio frequency spectrum band following the winning contention for access. Identifying the number of resource blocks may explicitly or implicitly include identifying a number of frequency resources allocated to the UE for the at least one uplink transmission. In some examples, the number of resource blocks (or number of frequency resources) may be identified with reference to one or more uplink grants or control signaling received at block 1405. In some examples, the identified number of resource blocks may include all of the resource blocks allocated to the UE for the at least one uplink transmission. In some examples, the operation(s) at block 1415 may be performed using the wireless communication management component 720, 820, 920, 1020, or 1160 described with reference to FIG. 7, 8, 9, 10, or 11, the allocated resource identification component 745, 845, or 945 described with reference to FIG. 7, 8, or 9, or the resource block identification component 855 described with reference to FIG. 8.

At block 1420, the method 1400 may include transmitting a channel reservation signal on the identified number of resource blocks. In some examples, the operation(s) at block 1420 may be performed using the wireless communication management component 720, 820, 920, 1020, or 1160 described with reference to FIG. 7, 8, 9, 10, or 11, or the channel reservation component 750, 850, 950, or 1050 described with reference to FIG. 7, 8, 9, or 10.

In some examples of the method 1400, the channel reservation signal may include a U-CUBS. In some examples, the U-CUBS may include a copy of a DM-RS scheduled to be transmitted in at least one of: a first subframe in which the winning contention for access occurs, a second subframe following the first subframe, or a combination thereof. In some examples, the U-CUBS may include at least a portion of a DM-RS sequence or at least a portion of an SRS sequence.

In some examples of the method 1400, the number of resource blocks may be identified in at least one PUSCH. In the same or other examples, the number of resource blocks may be identified in a subframe in which the winning contention for access occurs.

Thus, the method 1400 may provide for wireless communication. It should be noted that the method 1400 is just one implementation and that the operations of the method 1400 may be rearranged or otherwise modified such that other implementations are possible.

Figure 15:
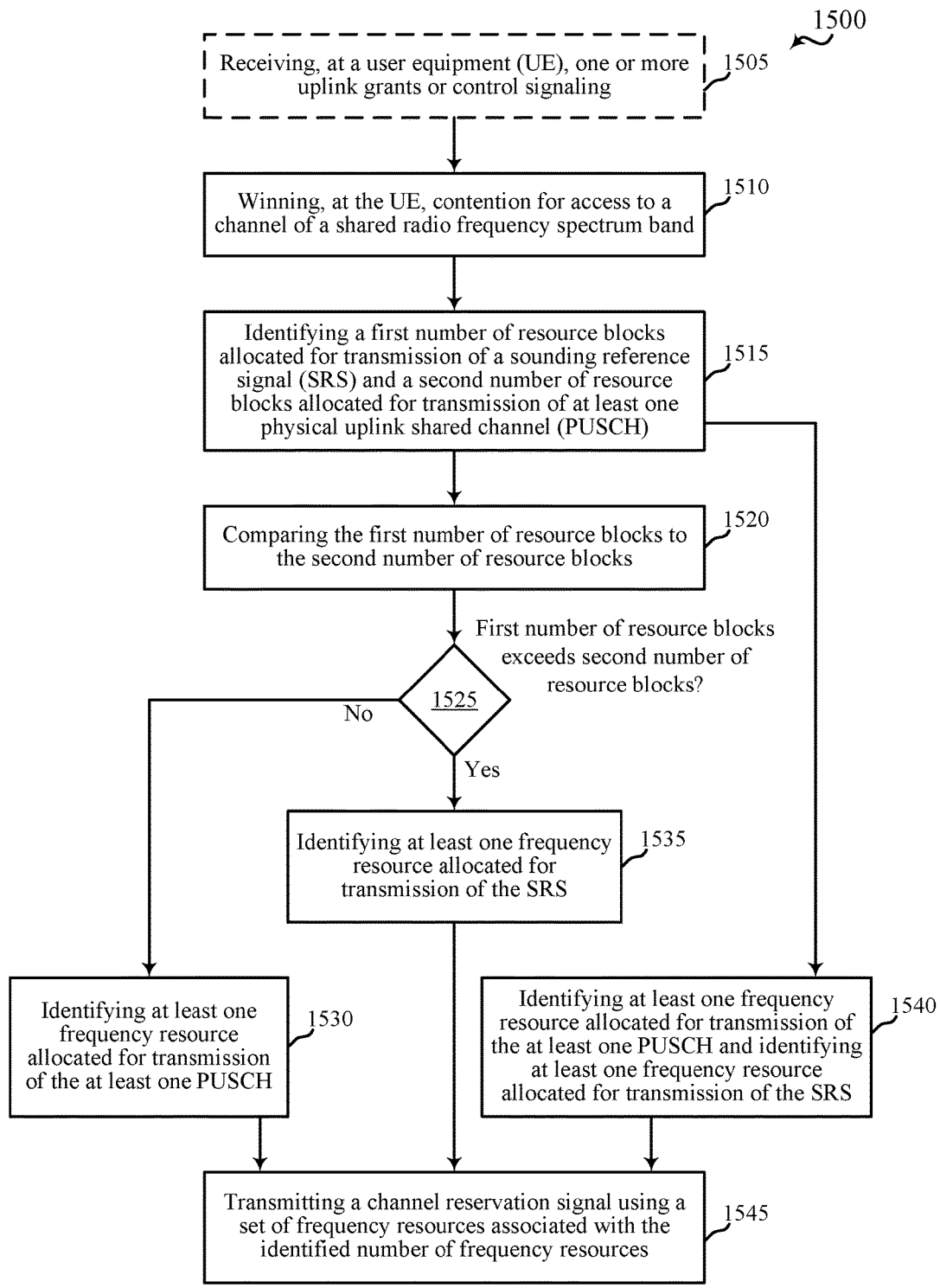
FIG. 15 is a flow chart illustrating an exemplary method for wireless communication, in accordance with various aspects of the present disclosure.

FIG. 15 is a flow chart illustrating an exemplary method 1500 for wireless communication, in accordance with various aspects of the present disclosure. For clarity, the method 1500 is described below with reference to aspects of one or more of the UEs 115, 215, 215-*a*, 215-*b*, 215-*c*, or 1115 described with reference to FIG. 1, 2, or 11, or aspects of one or more of the apparatuses 715, 815, 915, or 1015 described with reference to FIG. 7, 8, 9, or 10. In some examples, UE or apparatus may execute one or more sets of codes to control the functional elements of the UE or apparatus to perform the functions described below. Additionally or alternatively, the UE or apparatus may perform one or more of the functions described below using special-purpose hardware.

At block 1505, the method 1500 may optionally include receiving at a UE (e.g., from a base station) one or more uplink grants or control signaling (e.g., RRC signaling). In some examples, the uplink grant(s) or control signaling may include scheduling information for at least one uplink transmission over a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the operation(s) at block 1505 may be performed using the wireless communication management component 720, 820, 920, 1020, or 1160 described with reference to FIG. 7, 8, 9, 10, or 11, or the uplink grant and control signal processing component 735, 835, 935, or 1035 described with reference to FIG. 7, 8, 9, or 10.

At block 1510, the method 1500 may include winning, at a UE, contention for access to a channel of the shared radio frequency spectrum band. In some examples, the operation(s) at block 1510 may be performed using the wireless communication management component 720, 820, 920, 1020, or 1160 described with reference to FIG. 7, 8, 9, 10, or 11, or the channel contention component 740, 840, 940, or 1040 described with reference to FIG. 7, 8, 9, or 10.

At one or more of block 1515, block 1520, block 1525, block 1530, block 1535, or block 1540, the method 1500 may include identifying a number of frequency resources of the channel of the shared radio frequency spectrum band (or resource blocks) that are allocated to the UE for at least one uplink transmission. In some examples, the identified number of frequency resources may include all of the frequency resources allocated to the UE for the at least one uplink transmission. In some examples, the at least one uplink transmission may follow the winning contention for access. In some examples, part or all of the at least one uplink transmission may precede the winning contention for access, and may not be made despite resources having been allocated to the UE. In some examples, the number of frequency resources may be identified with reference to one or more uplink grants or control signaling received at block 1505. In some examples, the at least one uplink transmission may include an SRS and at least one PUSCH. In some examples, the SRS may be scheduled for transmission in a first symbol of a subframe.

At block 1515, the method 1500 may include identifying a first number of resource blocks allocated for transmission of the SRS and a second number of resource blocks allocated for transmission of the at least one PUSCH. In some examples, the operation(s) at block 1515 may be performed using the wireless communication management component 720, 820, 920, 1020, or 1160 described with reference to FIG. 7, 8, 9, 10, or 11, the allocated resource identification component 745, 845, or 945 described with reference to FIG. 7, 8, or 9, or the SRS resource identification component 955 or PUSCH resource identification component 960 described with reference to FIG. 9.

At block 1520, the method 1500 may include comparing the first number of resource blocks to the second number of resource blocks (e.g., to determine, at block 1525, whether the first number of resource blocks exceeds the second number of resource blocks). In some examples, the operation(s) at block 1520 may be performed using the wireless communication management component 720, 820, 920, 1020, or 1160 described with reference to FIG. 7, 8, 9, 10, or 11, the allocated resource identification component 745, 845, or 945 described with reference to FIG. 7, 8, or 9, or the resource comparison component 965 described with reference to FIG. 9.

When the second number of resource blocks exceeds the first number of resource blocks, the method 1500 may include, at block 1530, identifying at least one frequency resource allocated for transmission of the at least one PUSCH. When the first number of resource blocks exceeds the second number of resource blocks, the method 1500 may include, at block 1535, identifying at least one frequency resource allocated for transmission of the SRS. In some examples, the operation(s) at block 1520 may be performed using the wireless communication management component 720, 820, 920, 1020, or 1160 described with reference to FIG. 7, 8, 9, 10, or 11, the allocated resource identification component 745, 845, or 945 described with reference to FIG. 7, 8, or 9, or the resource block identification component 855 described with reference to FIG. 8.

At block 1540, and in an alternative example to the operations provided by the blocks 1520, 1525, 1530, and 1535, the method 1500 may include identifying at least one frequency resource allocated for transmission of the at least one PUSCH and identifying at least one frequency resource allocated for transmission of the SRS.

At block 1545, the method 1500 may include transmitting a channel reservation signal using a set of frequency resources associated with the identified number of frequency resources. In some examples, the operation(s) at block 1545 may be performed using the wireless communication management component 720, 820, 920, 1020, or 1160 described with reference to FIG. 7, 8, 9, 10, or 11, or the channel reservation component 750, 850, 950, or 1050 described with reference to FIG. 7, 8, 9, or 10.

In some examples of the method 1500, the channel reservation signal may include a U-CUBS. The U-CUBS may be transmitted between the winning contention for access to the channel of the shared radio frequency spectrum band and the at least one uplink transmission. The U-CUBS may also or alternatively be transmitted on resource blocks allocated to the at least one uplink transmission. In some examples, the U-CUBS may include a copy of a DM-RS scheduled to be transmitted in at least one of: a first subframe in which the winning contention for access occurs, a second subframe following the subframe, or a combination thereof. In some examples, the U-CUBS may include at least a portion of a DM-RS sequence or at least a portion of an SRS sequence.

Thus, the method 1500 may provide for wireless communication. It should be noted that the method 1500 is just one implementation and that the operations of the method 1500 may be rearranged or otherwise modified such that other implementations are possible.

Figure 16:
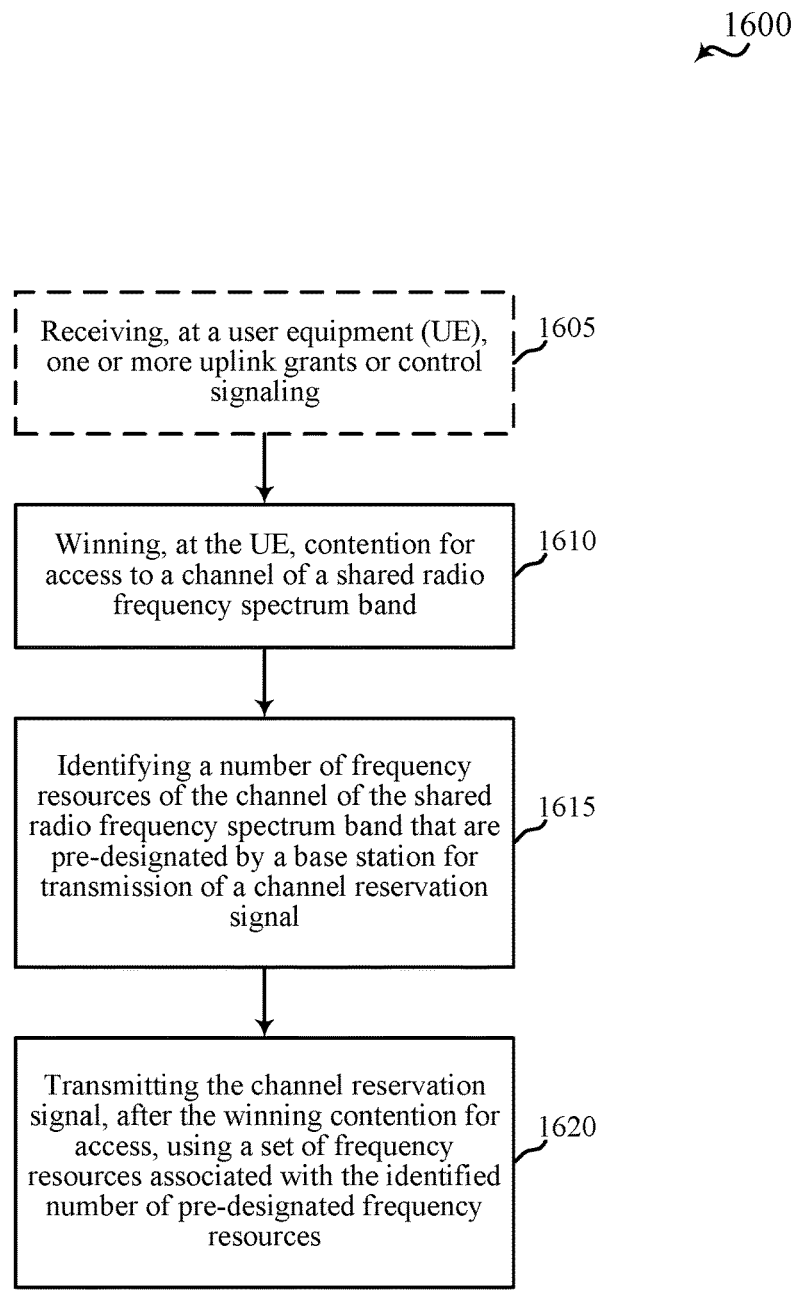
FIG. 16 is a flow chart illustrating an exemplary method for wireless communication, in accordance with various aspects of the present disclosure.

FIG. 16 is a flow chart illustrating an exemplary method 1600 for wireless communication, in accordance with various aspects of the present disclosure. For clarity, the method 1600 is described below with reference to aspects of one or more of the UEs 115, 215, 215-a, 215-b, 215-c, or 1115 described with reference to FIG. 1, 2, or 11, or aspects of one or more of the apparatuses 715, 815, 915, or 1015 described with reference to FIG. 7, 8, 9, or 10. In some examples, UE or apparatus may execute one or more sets of codes to control the functional elements of the UE or apparatus to perform the functions described below. Additionally or alternatively, the UE or apparatus may perform one or more of the functions described below using special-purpose hardware.

At block 1605, the method 1600 may optionally include receiving at a UE (e.g., from a base station) one or more uplink grants or control signaling (e.g., RRC signaling). In some examples, the uplink grant(s) or control signaling may indicate a number of frequency resources (or resource blocks) of a shared radio frequency spectrum band that are designated for transmission of a channel reservation signal. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). In some examples, the operation(s) at block 1605 may be performed using the wireless communication management component 720, 820, 920, 1020, or 1160 described with reference to FIG. 7, 8, 9, 10, or 11, or the uplink grant and control signal processing component 735, 835, 935, or 1035 described with reference to FIG. 7, 8, 9, or 10.

At block 1610, the method 1600 may include winning, at a UE, contention for access to a channel of the shared radio frequency spectrum band. In some examples, the operation(s) at block 1610 may be performed using the wireless communication management component 720, 820, 920, 1020, or 1160 described with reference to FIG. 7, 8, 9, 10, or 11, or the channel contention component 740, 840, 940, or 1040 described with reference to FIG. 7, 8, 9, or 10.

At block 1615, the method 1600 may include identifying a number of frequency resources of the channel of the shared radio frequency spectrum band that are pre-designated by a base station for transmission of a channel reservation signal. In some examples, the number of pre-designated frequency resources may be identified with reference to one or more uplink grants or control signaling received at block 1605. In some examples, the operation(s) at block 1615 may be performed using the wireless communication management component 720, 820, 920, 1020, or 1160 described with reference to FIG. 7, 8, 9, 10, or 11, or the pre-designated resource identification component 1045 described with reference to FIG. 10.

At block 1620, the method 1600 may include transmitting a channel reservation signal using a set of frequency resources associated with the identified number of pre-designated frequency resources. In some examples, the operation(s) at block 1620 may be performed using the wireless communication management component 720, 820, 920, 1020, or 1160 described with reference to FIG. 7, 8, 9, 10, or 11, or the channel reservation component 750, 850, 950, or 1050 described with reference to FIG. 7, 8, 9, or 10.

In some examples of the method 1600, the channel reservation signal may include a U-CUBS. In some examples, the channel reservation signal may include a junk transmission (e.g., a transmission that a base station receiving the junk transmission may ignore). The U-CUBS or junk transmission may be transmitted between the winning contention for access to the channel of the shared radio frequency spectrum band and the at least one uplink transmission, or during a gap in at least one uplink transmission. In some examples, the U-CUBS or junk transmission may be transmitted during a first subframe, and the at least one uplink transmission may be transmitted during at least one subframe following the first subframe. In some examples, the U-CUBS or junk transmission may be transmitted in a same subframe as the at least one uplink transmission. In some examples, the U-CUBS may include a copy of a DM-RS scheduled to be transmitted in at least one of: a first subframe in which the winning contention for access occurs, a second subframe following the first subframe, or a combination thereof. In some examples, the U-CUBS may include at least a portion of a DM-RS sequence or at least a portion of an SRS sequence.

In some examples of the method 1600, the number of frequency resources pre-designated by the base station may include at least one of: a cyclic shift per resource block of a PUCCH, a code per resource block of the PUCCH, or a combination thereof.

Thus, the method 1600 may provide for wireless communication. It should be noted that the method 1600 is just one implementation and that the operations of the method 1600 may be rearranged or otherwise modified such that other implementations are possible.

In some examples, aspects of two or more of the methods 1300, 1400, 1500, or 1600 described with reference to FIG. 13, 14, 15, or 16 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communications, comprising:
   contending, at a user equipment (UE), for access to a channel of a shared radio frequency spectrum band;
   determining, based at least in part on the contending, that the channel of the shared radio frequency spectrum band is available;
   identifying a number of frequency resources of the channel of the shared radio frequency spectrum band that are allocated to the UE for at least one uplink transmission following the contention for access, the number of frequency resources includes at least one frequency resource allocated to a physical uplink shared channel (PUSCH); and
   transmitting, based at least in part on the determining, a channel reservation signal using a set of frequency resources associated with the identified number of frequency resources the channel reservation signal comprises an uplink channel usage beacon signal (U-CUBS).

2. The method of claim 1, wherein the U-CUBS is transmitted between the contention for access to the channel of the shared radio frequency spectrum band and the at least one uplink transmission.

3. The method of claim 1, wherein the U-CUBS is transmitted during a first subframe, and the at least one uplink transmission is transmitted during at least one subframe following the first subframe.

4. The method of claim 1, wherein the PUSCH is scheduled for transmission on a first number of frequency resources in a first slot of a subframe.

5. The method of claim 4, wherein the PUSCH is further scheduled for transmission on a second number of frequency resources in a second slot of the subframe.

6. The method of claim 1, wherein at least one physical uplink shared channel (PUSCH) and at least one physical uplink control channel (PUCCH) are scheduled to be transmitted following the contention for access, and wherein identifying the number of frequency resources that are allocated to the UE for the at least one uplink transmission comprises:
   identifying at least one frequency resource allocated for transmission of the at least one PUSCH but not identifying a frequency resource allocated to the at least one PUCCH.

7. The method of claim 1, wherein the number of frequency resources is identified in at least one uplink grant or at least one control signal.

8. The method of claim 1, wherein:
identifying the number of frequency resources that are allocated to the UE for the at least one uplink transmission comprises identifying a number of resource blocks including the number of frequency resources; and
transmitting the U-CUBS comprises transmitting the U-CUBS on the identified number of resource blocks.

9. The method of claim 8, wherein the number of resource blocks are identified in at least one PUSCH.

10. The method of claim 8, wherein the number of resource blocks are identified in a subframe in which the contention for access occurs.

11. The method of claim 1, wherein the at least one uplink transmission comprises a sounding reference signal (SRS).

12. The method of claim 1, wherein a sounding reference signal (SRS) and at least one physical uplink shared channel (PUSCH) are scheduled for transmission following the contention for access, and wherein the SRS is scheduled for transmission in a first symbol of a subframe.

13. The method of claim 12, further comprising:
identifying a first number of resource blocks allocated for transmission of the SRS and a second number of resource blocks allocated for transmission of the at least one PUSCH;
wherein identifying the number of frequency resources that are allocated to the UE for the at least one uplink transmission comprises:
identifying at least one frequency resource allocated for transmission of the at least one PUSCH when the second number of resource blocks exceeds the first number of resource blocks; and
identifying at least one frequency resource allocated for transmission of the SRS when the first number of resource blocks exceeds the second number of resource blocks.

14. The method of claim 12, wherein identifying the number of frequency resources that are allocated to the UE for the at least one uplink transmission comprises:
identifying at least one frequency resource allocated for transmission of the at least one PUSCH; and
identifying at least one frequency resource allocated for transmission of the SRS.

15. The method of claim 1, wherein the U-CUBS comprises a copy of a demodulation reference signal (DM-RS) scheduled to be transmitted in at least one of:
a first subframe in which the contention for access occurs, a second subframe following the first subframe, or a combination thereof.

16. An apparatus for wireless communications, comprising:
a processor;
memory in electronic communication with the processor; and
instructions stored in the memory, the instructions being executable by the processor to:
contend, at a user equipment (UE), for access to a channel of a shared radio frequency spectrum band;
determine, based at least in part on the contending, that the channel of the shared radio frequency spectrum band is available;
identify a number of frequency resources of the channel of the shared radio frequency spectrum band that are allocated to the UE for at least one uplink transmission following the contention for access, the number of frequency resources includes at least one frequency resource allocated to a physical uplink shared channel (PUSCH); and
transmit, based at least in part on the determination, a channel reservation signal using a set of frequency resources associated with the identified number of frequency resources the channel reservation signal comprises an uplink channel usage beacon signal (U-CUBS).

17. The apparatus of claim 16, wherein the U-CUBS is transmitted between the contention for access to the channel of the shared radio frequency spectrum band and the at least one uplink transmission.

18. The apparatus of claim 16, wherein the U-CUBS is transmitted during a first subframe, and the at least one uplink transmission is transmitted during at least one subframe following the first subframe.

19. A method for wireless communications, comprising:
contending, at a user equipment (UE), for access to a channel of a shared radio frequency spectrum band;
determining, based at least in part on the contending, that the channel of the shared radio frequency spectrum band is available;
identifying a number of frequency resources of the channel of the shared radio frequency spectrum band that are allocated to the UE for at least one uplink transmission following the contention for access, the number of frequency resources includes at least one frequency resource allocated to a physical uplink shared channel (PUSCH); and
transmitting, based at least in part on the determining, the channel reservation signal, after the contention for access, using a set of frequency resources associated with the identified number of pre-designated frequency resources, the channel reservation signal comprises an uplink channel usage beacon signal (U-CUBS).

20. The method of claim 19, wherein the number of frequency resources pre-designated by the base station comprise at least one of:
a cyclic shift per resource block of a physical uplink control channel (PUCCH), a code per resource block of the PUCCH, or a combination thereof.

21. The method of claim 19, wherein the U-CUBS is transmitted between the contention for access to the channel of the shared radio frequency spectrum band and at least one uplink transmission.

22. The method of claim 19, wherein the channel reservation signal comprises a junk transmission.

23. The method of claim 19, wherein the channel reservation signal is transmitted during a gap in at least one uplink transmission.

24. An apparatus for wireless communications, comprising:
a processor;
memory in electronic communication with the processor; and
instructions stored in the memory, the instructions being executable by the processor to:
contend, at a user equipment (UE), for access to a channel of a shared radio frequency spectrum band;
determine, based at least in part on the contending, that the channel of the shared radio frequency spectrum band is available;
identify a number of frequency resources of the channel of the shared radio frequency spectrum band that are allocated to the UE for at least one uplink transmission following the contention for access, the number of frequency resources includes at least one frequency resource allocated to a physical uplink shared channel (PUSCH); and transmit, based at least in part on the determination, the channel reservation signal, after the contention for access, using a set of frequency resources associated with the identified number of pre-designated frequency resources, the channel reservation signal comprises an uplink channel usage beacon signal (U-CUBS).

25. The apparatus of claim 24, wherein the number of frequency resources pre-designated by the base station comprise at least one of:

a cyclic shift per resource block of a physical uplink control channel (PUCCH), a code per resource block of the PUCCH, or a combination thereof.

26. The apparatus of claim 24, wherein the U-CUBS is transmitted between the contention for access to the channel of the shared radio frequency spectrum band and at least one uplink transmission.

* * * * *